(12) United States Patent
Shimada et al.

(10) Patent No.: US 7,320,056 B2
(45) Date of Patent: Jan. 15, 2008

(54) MULTI-PROCESSOR SYSTEM

(75) Inventors: Takeshi Shimada, Kawasaki (JP);
Tatsuru Nakagaki, Kawasaki (JP);
Akihiro Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 234 days.

(21) Appl. No.: 11/285,184

(22) Filed: Nov. 23, 2005

(65) Prior Publication Data
US 2006/0075197 A1   Apr. 6, 2006

Related U.S. Application Data

(63) Continuation of application No. PCT/JP03/06868, filed on May 30, 2003.

(51) Int. Cl.
*G06F 13/16* (2006.01)

(52) U.S. Cl. .................................... 711/147

(58) Field of Classification Search ............ 711/147, 711/150; 709/213
See application file for complete search history.

(56) References Cited

U.S. PATENT DOCUMENTS

| | | | |
|---|---|---|---|
| 5,386,511 A | 1/1995 | Murata et al. | |
| 5,530,933 A | 6/1996 | Frink et al. | |
| 5,564,034 A | 10/1996 | Miyake | |
| 5,584,010 A * | 12/1996 | Kawai et al. | 711/117 |
| 5,701,413 A | 12/1997 | Zulian et al. | |
| 6,484,220 B1 | 11/2002 | Alvarez, II et al. | |
| 2004/0139296 A1* | 7/2004 | Litaize et al. | 712/11 |

FOREIGN PATENT DOCUMENTS

| | | |
|---|---|---|
| JP | 56-163572 | 12/1981 |
| JP | 4-328653 | 11/1992 |
| JP | 6-161900 | 6/1994 |
| JP | 7-281956 | 10/1995 |
| JP | 7-311751 | 11/1995 |
| JP | 2001-101147 | 4/2001 |

OTHER PUBLICATIONS

James Archibald et al., "Cache Coherence Protocols: Evaluation Using a Multiprocessor Simulation Model", ACM Transactions on Computer Systems, vol. 4, No. 4, Nov. 1986, pp. 273-298.
Makoto Uchiba et al., "Performance Improvement about a Multi-Processing System with Common Memory", Fujitsu Nishi-Nihon Communication Systems Limited and Fujitsu Limited, Mar. 19, 2003.

* cited by examiner

*Primary Examiner*—Kevin L. Ellis
(74) *Attorney, Agent, or Firm*—Staas & Halsey LLP

(57) ABSTRACT

Data transmission for writing data into a shared memory is performed by a high-speed dedicated line provided between each processor and the shared memory. When a processor performs writing to a shared memory space, the processor notifies an update notification bus corresponding to the conventional global bus, to which address the update is to be performed. The other processors which have detected this notification inhibit access to that address and wait for the write data to be sent to the address via the dedicated line. When the data has arrived, the data is written into the corresponding address. Here, the data is also written into the corresponding address, thereby maintaining the cache coherency. Moreover, when transmitting a write address, it is necessary to acquire the bus use right while data transmission is performed by using the dedicated line, which significantly reduces the time required for acquiring the bus use right.

10 Claims, 28 Drawing Sheets

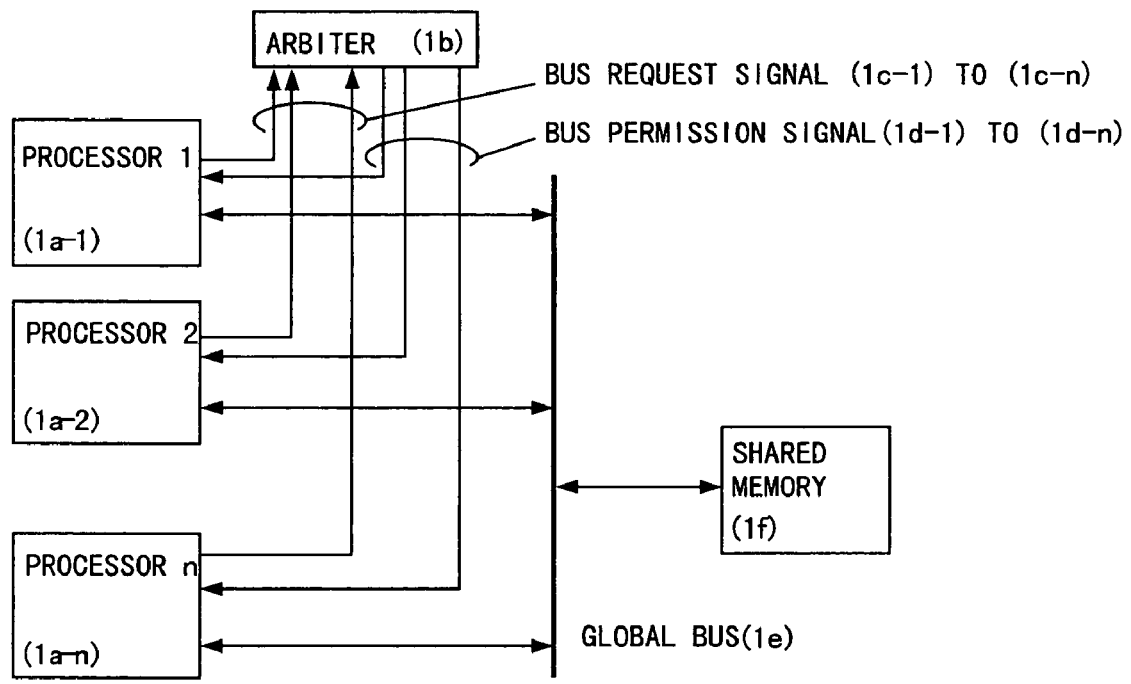
F I G. 1

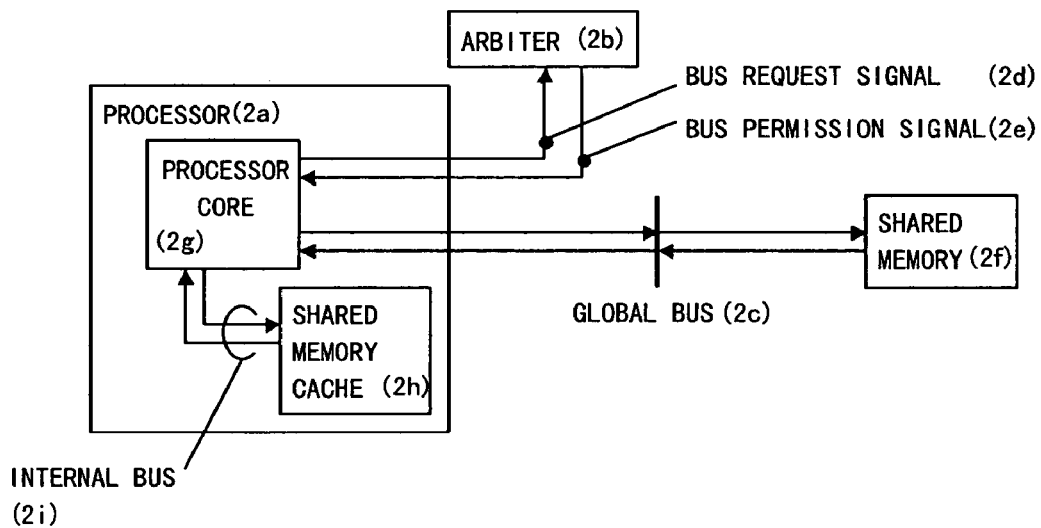
F I G. 2

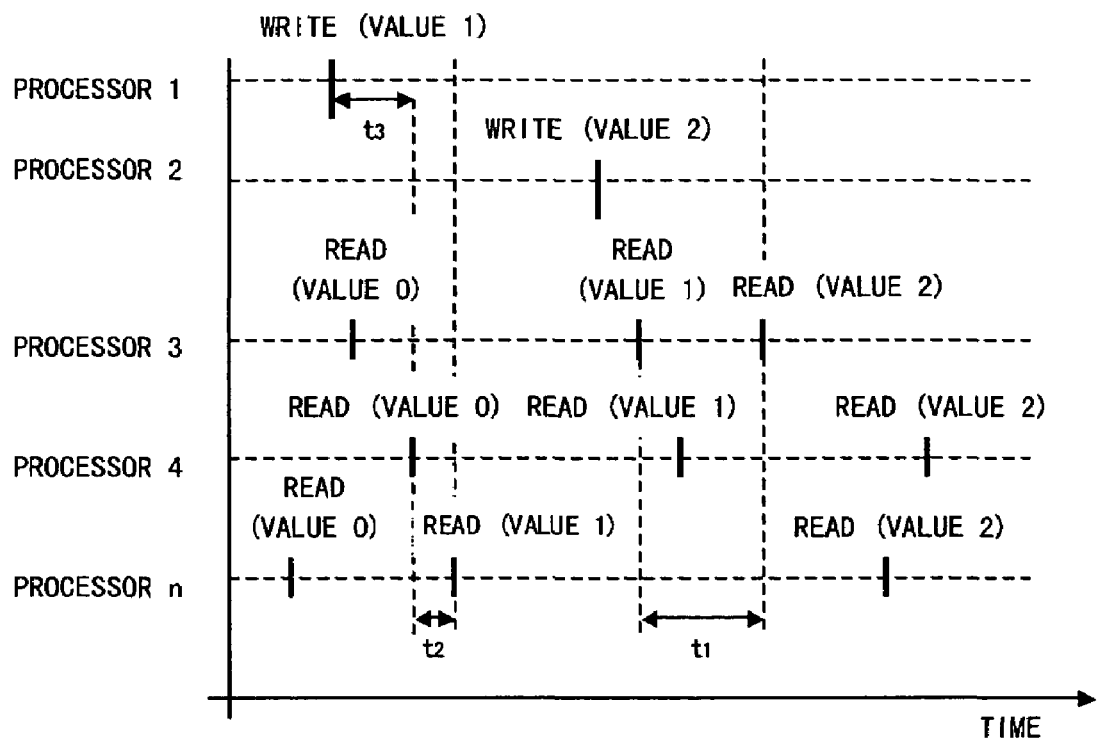
F I G. 3

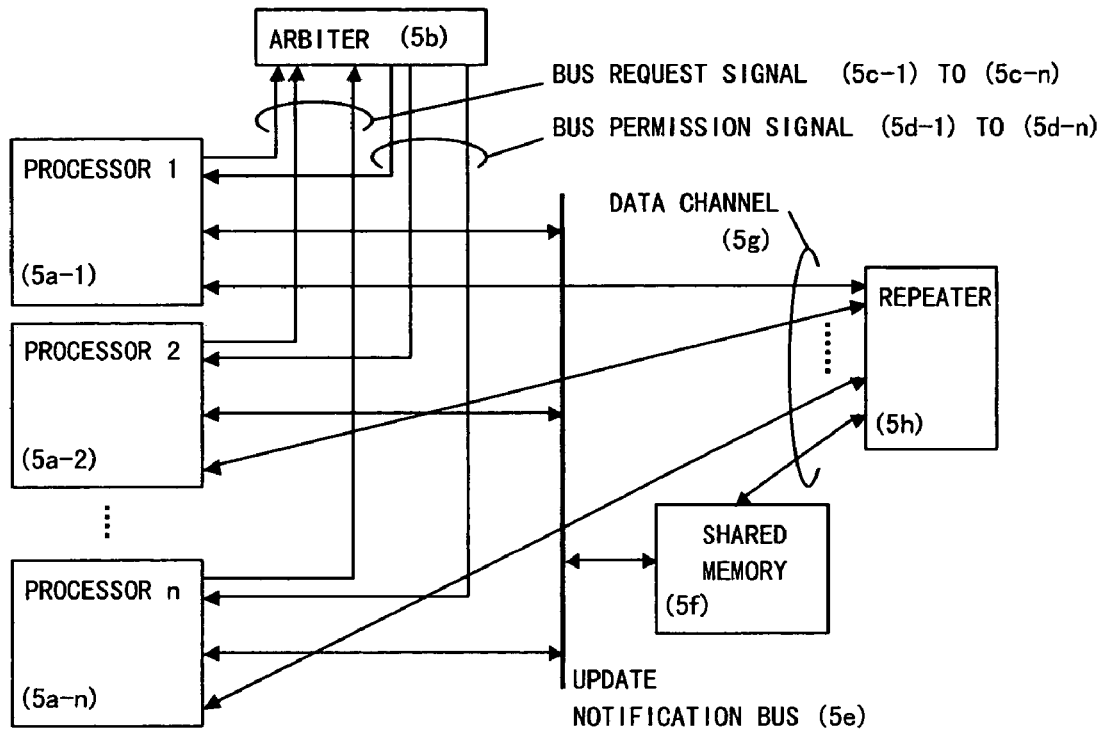
F I G. 5

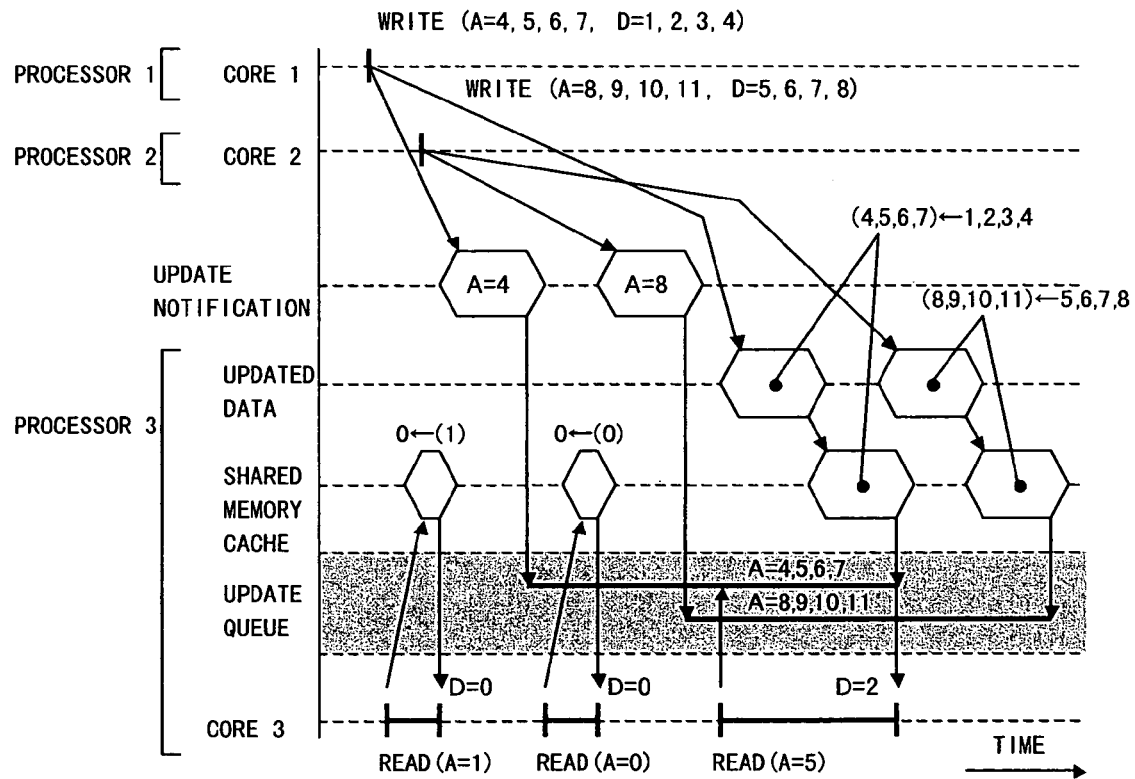
F I G. 7

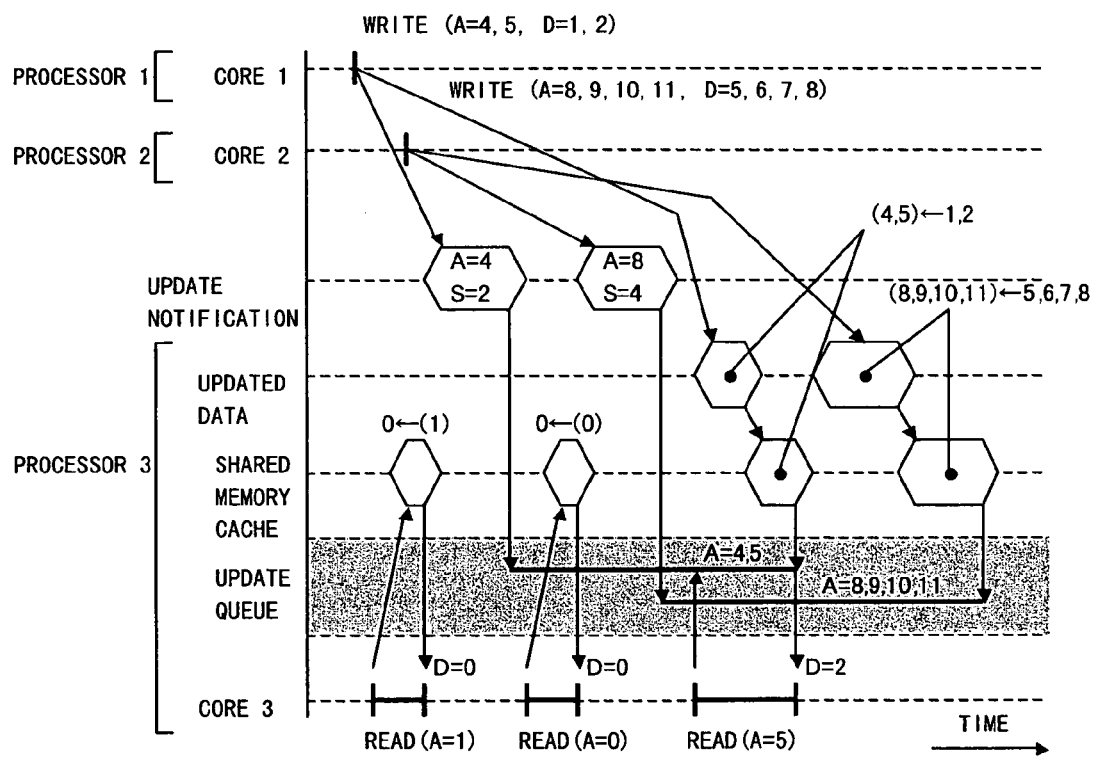
F I G. 8

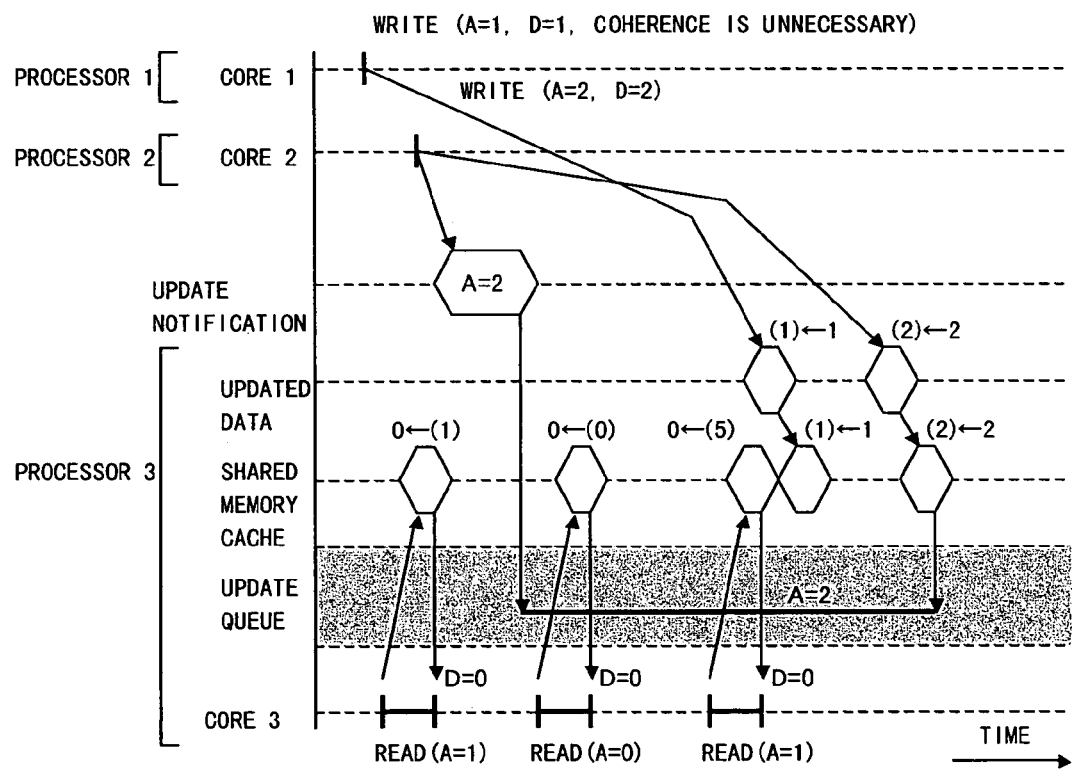
F I G. 9

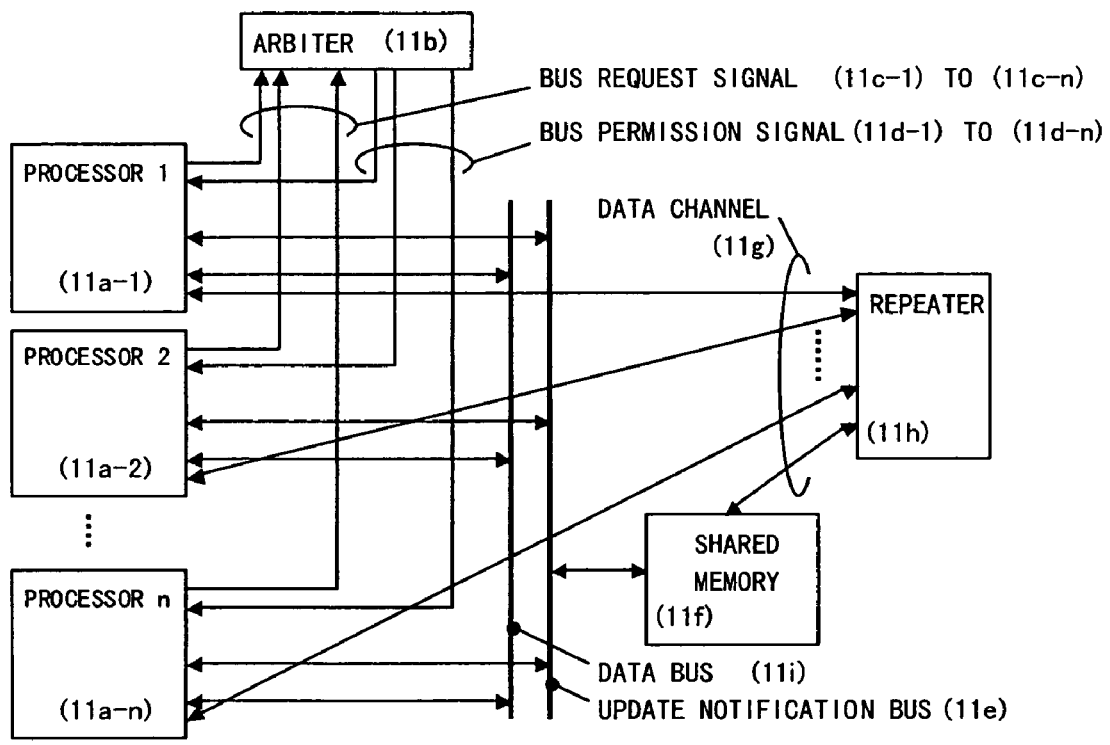
F I G. 11

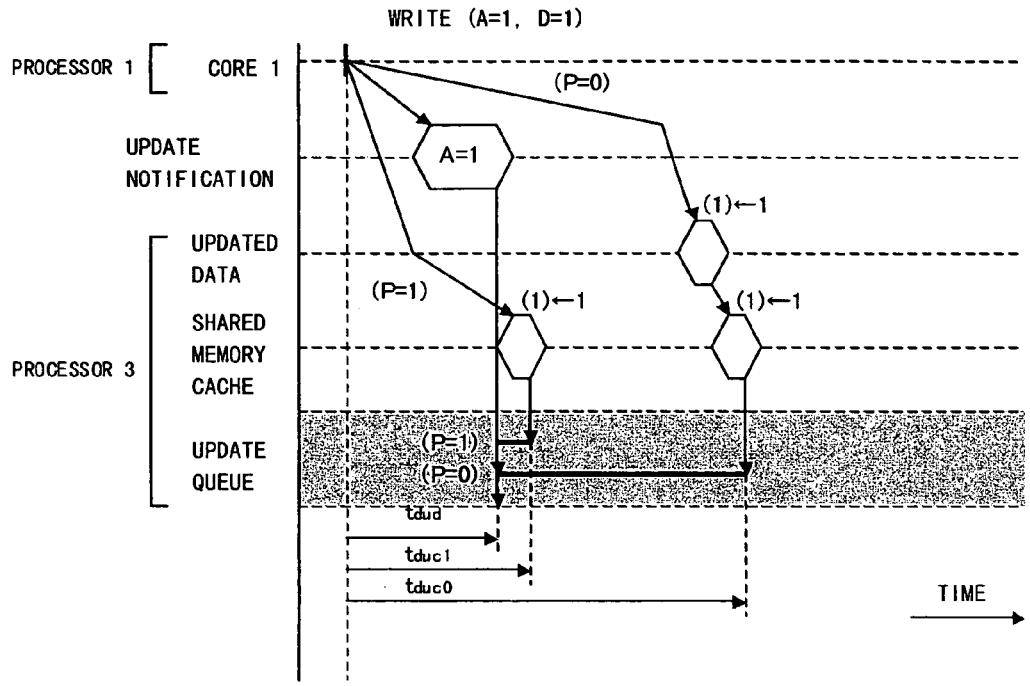
(a)
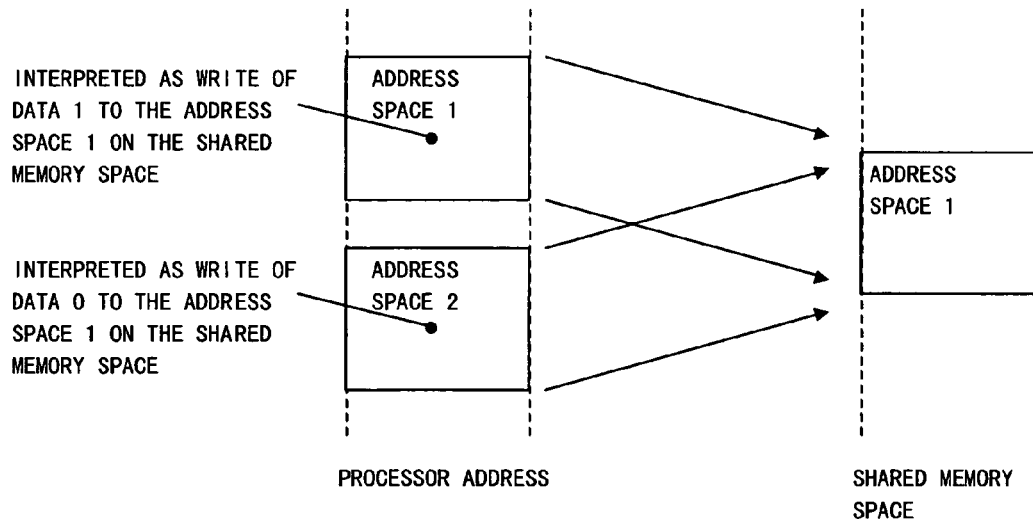
(b)
FIG. 13

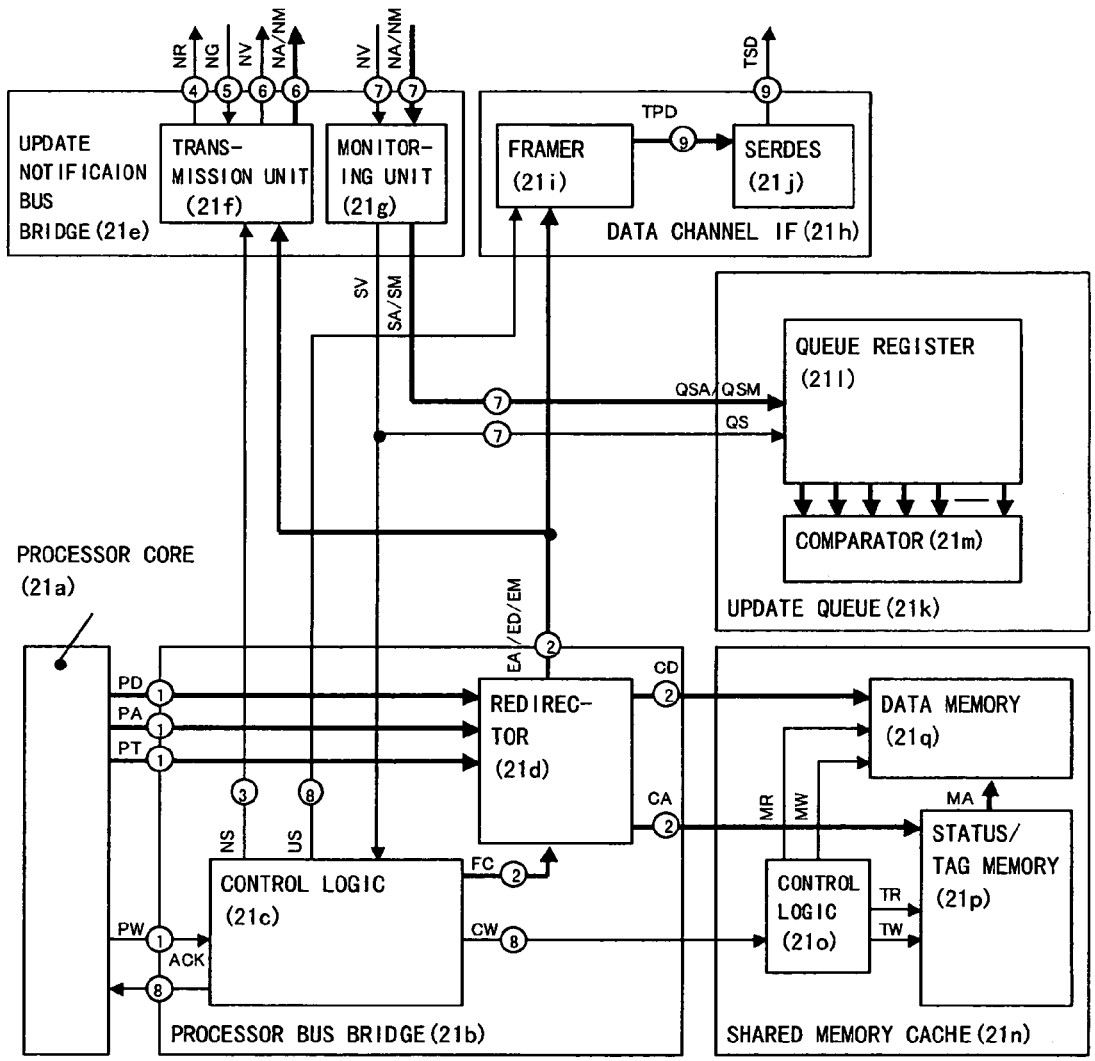
F I G. 21

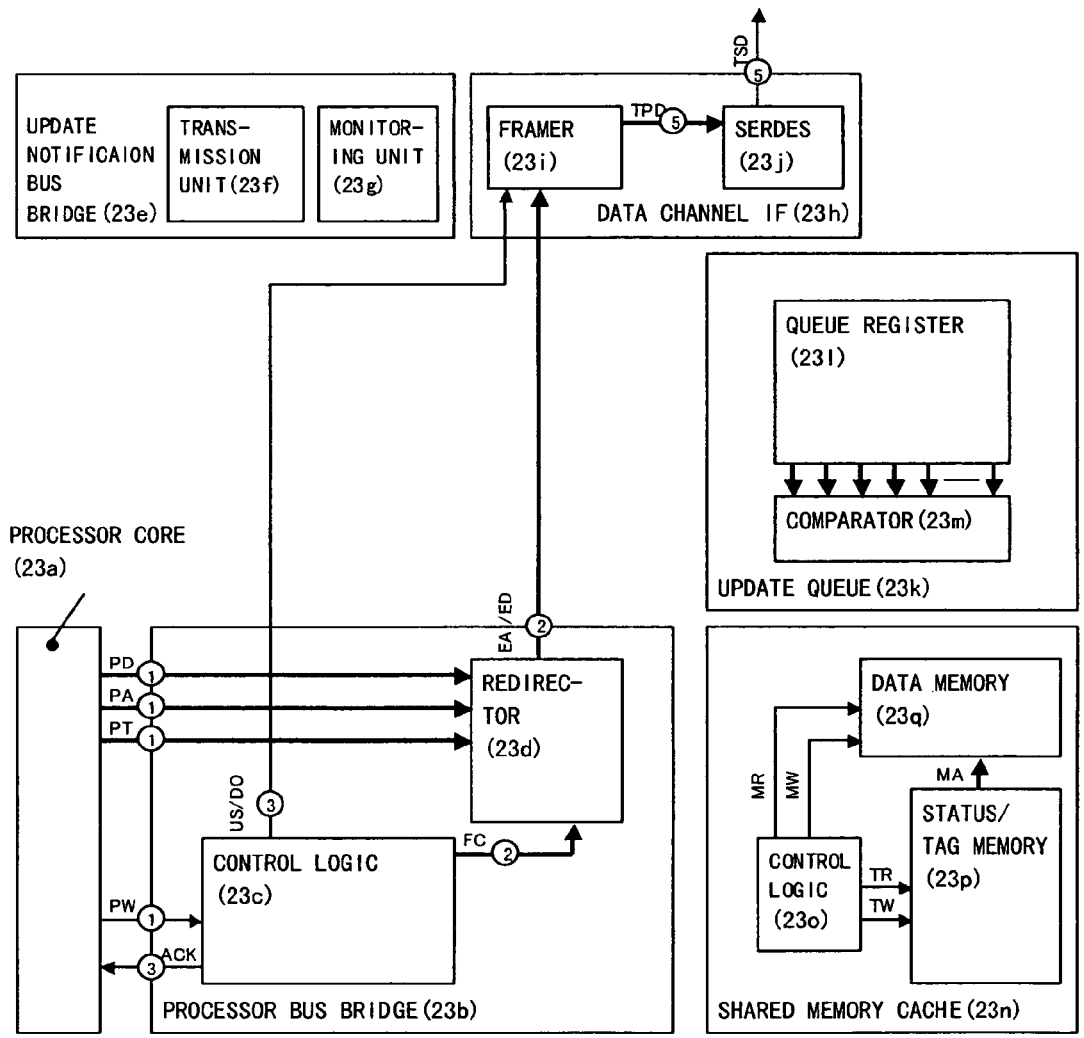
F I G. 23

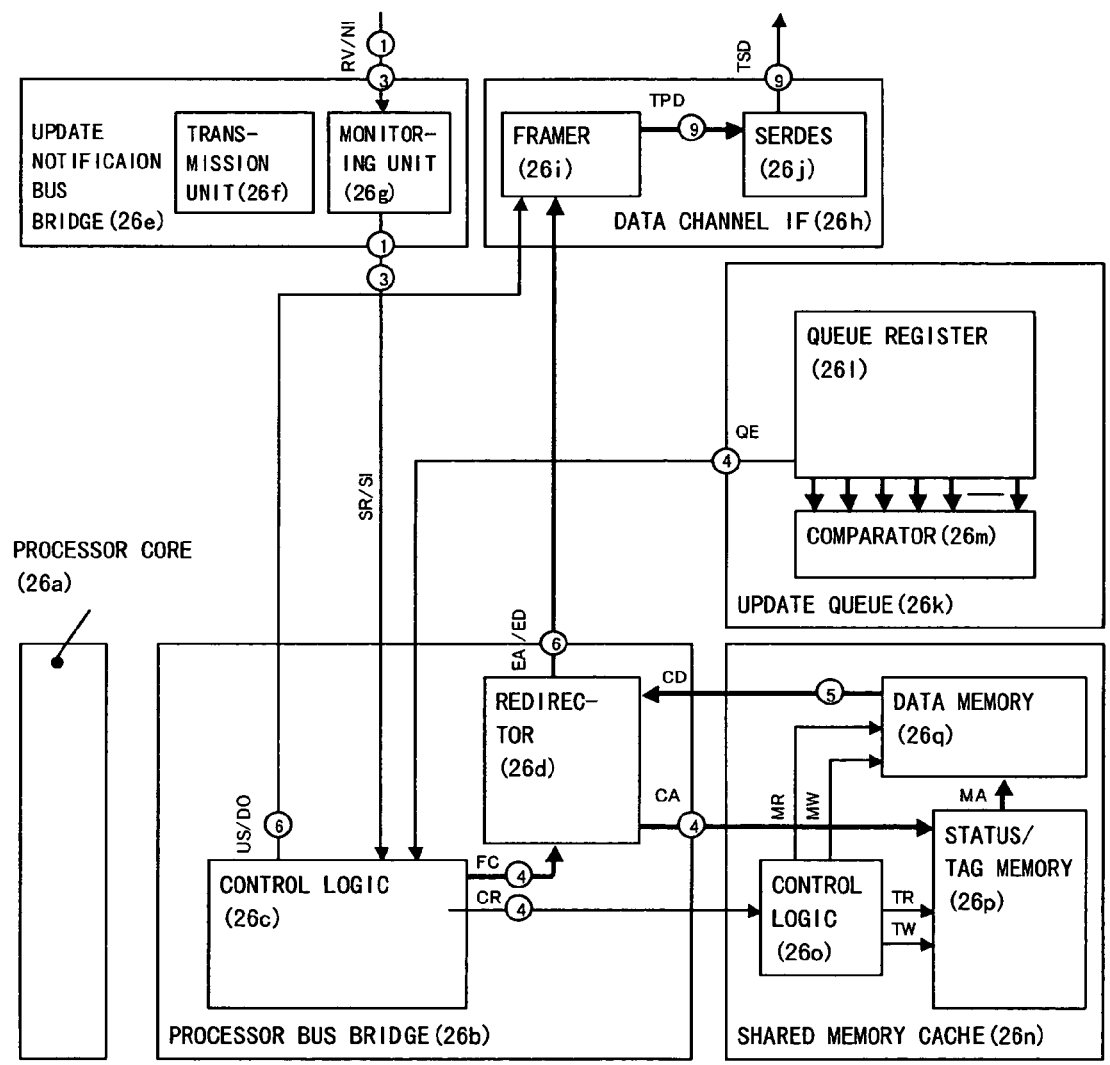
F I G. 2 6

MULTI-PROCESSOR SYSTEM

CROSS REFERENCE TO RELATED APPLICATION

This application is a continuation of international PCT application No. PCT/JP2003/006868 filed on May 30, 2003.

BACKGROUND OF THE INVENTION

1. Field of the Invention

The present invention relates to a shared memory type multi-processor system in which a plurality of processors are connected and a shared memory space shared by the processors is arranged, and more specifically to a system comprising processors having a shared memory cache for caching data in the shared memory space. Processing of software is performed by each individual processor, and the shared memory is used as the space for transferring data when the processing is handed over between processors and for storing information which should be managed not by standalone processors but by a system. The shared memory cache is introduced to improve the performance of the system by speeding up access to the shared memory.

2. Description of the Related Art

FIG. 1 shows a conventional example of the simplest shared memory type multi-processor system.

A plurality of processors and shared memory are connected by the same global bus, and each processor accesses the shared memory via this global bus. Each processor (1a-1) to (1a-n) transmits a bus request signal (1c-1) to (1c-n) to an arbiter (1b), the right to use the global bus is arbitrated by the arbiter, the right to use the global bus (1e) is only given to one processor at a time, and a bus permission signal (1d-1) to (1d-n) is transmitted to that processor. The processor which has received the bus permission signal accesses the shared memory (1f) via the global bus and receives the desired data.

In the implementation shown in FIG. 1, all access to the shared memory regardless of the kind of read or write, is performed via the global bus. Here, there are two restrictions.

Restriction 1: It takes time to transmit the signals. (Physical restriction)

Restriction 2: It takes time to wait and acquire the right to use the global bus. (Theoretical restriction)

The former is ascribed to the fact that it is difficult to transmit the signals at high speed because of the electrical conditions when the signal transmission distance in the global bus becomes long, and a plurality of processors share the same signal line. The latter is ascribed to the fact that when two or more processors access the shared memory at the same time, the time which is required to wait until the second and subsequent processors access the shared memory owing to the arbitration of the right to use the global bus arises. As a result, these restrictions give rise to the following problems to the access to the shared memory space.

Problem 1: Shortage of an area (the number of times of access per unit time which is permissible to the system)

Problem 2: Excess of latency (time required from the start of access to the end of access)

FIG. 2 shows a conventional example in which a shared memory cache (2h) is arranged in each processor.

When a processor core (2g) reads the shared memory space, and if there is a copy of the data of the shared memory space in the shared memory cache, the read processing can be completed by the processor via an internal bus (2i), and Restriction 1 can be reduced thereby. Since the access to the shared memory space is not performed via the global bus, the arbitration of the right to use the global bus is not required, so that the processor (2a) is released from Restriction 2. In this respect, the introduction of the shared memory cache can be a measure for solving the two problems described above.

Each processor can hold an individual copy of the data of the shared memory space by introducing the shared memory cache, but the data in the shared memory space must look same to all the processors. Consequently, for write processing which is the opportunity for updating the data, it is absolutely necessary to consider the control of coherency which ensures this. This control of coherency is also an obstacle for solving the above-mentioned problems, the reasons for which will be described later.

Here, the requirements for the control of coherency are divided into three as follows.

Requirement 1: Synchronization in terms of time
Requirement 2: Synchronization in terms of space
Requirement 3: Reduction of update time FIG. 3 shows the control of coherency. FIG. 3 explains the meaning of said requirements, and it is assumed therein that when data of an address on the shared memory space is value 0, processor 1 writes value 1 to said address, and after then, processor 2 writes value 2, and the other processors 3 to n read said address. Here, Requirement 1 corresponds to, for example, excluding the possibility of reading the values in the order from 2 to 1 (ensuring $t_1 \geq 0$), and Requirement 2 corresponds to, for example, excluding the possibility that although there is a processor which has already read value 1, another processor which reads value 0 later is generated (ensuring $t_2 \geq 0$). Requirement 3 corresponds to shortening both the time required from the time when data is updated to the time when the other processors are still reading the data before updating and the time required from the time when data is updated to the time when the other processors can read the data after updating as much as possible (minimization of $t_2$ and $t_3$). Requirement 3 is not an indispensable requirement for the control of coherency, but is required to improve the performance of the system.

Given as an example of the control of coherency shown in FIG. 3 is a method in which every time a processor performs write a process to the shared memory space, the processor reflects the write process to its own shared memory cache and writes to the shared memory via the global bus at the same time, and the other processors monitor write access appearing on the global bus and when data of said address is in each shared memory cache, the other processors replace the data by the data on the global bus.

FIG. 4 shows an example of the method of establishing cache coherency. FIG. 4 is an example of the processing sequence based on the above-mentioned method. The timing of (4a) to (4f) shown in the figure corresponds to the following phenomenon.

(4a): The processor starts write access.
(4b): When write access is started, the processor transmits a global bus request.
(4c): The processor receives bus use permission, and outputs address data to the global bus.
(4d): The other processors and the shared memory receive information from the global bus, and write it to their shared memory or their shared memory cache.
(4e): Write to the memory is completed.
(4f): The processor which started the write access releases the bus.

In this example, conditions necessary to ensure coherency are indicated by the following expressions.

$$t_{rc(min)} > t_{dsd(max)} + t_{dmw(max)} \quad (1)$$

$$t_{dsd(max)} < t_{dsd(min)} + t_{dmw(min)} \quad (2)$$

Here, $t_{rc}$: Time required from the issue of a write to the global bus to the release of the bus $t_{dsd}$: Time required for the other processors to recognize the issue of a write to the global bus $t_{dmw}$: Time required for the processor and the shared memory to recognize a write access on the global bus and reflect the data to themselves Here, expression (1) is a condition for satisfying Requirement 1, and guarantees that the processor releases the global bus after the write value is reflected to the shared memory cache on the shared memory and all the processors. (Generally, a sequence in which the response of write completion is transmitted from the side of the shared memory into which data writing is performed and the bus is released when the processor receives the response is commonly employed.) When the next processor begins write processing according to the arbitration of the right to use the global bus by satisfying said condition, it is guaranteed that the previous write processing has been completed. That is it is as if the requirements for the control of coherency were satisfied by a disadvantage of the global bus, but in fact, there is no essential difference from the fact that Requirement 1 requires arbitration for updating data. This is because guaranteeing the order of updating data is equivalent to guaranteeing that a plurality of data updates do not occur at the same time, namely, performing arbitration. Therefore, to satisfy Requirement 1 for the control of coherency means that Requirement 2 which arises in using the global bus is imposed in the same way, thereby causing an obstacle for solving the problems.

Expression (2) is a condition for satisfying Requirement 2 by absorbing the variation in the timing of (4d) shown in FIG. 4. The timing of (4d) is the boundary between whether data before updating is returned to the processor core or data after updating is returned to the processor core, when read access contending with write access arising on the global bus is started on each processor. Since the timing at which data, after being updated, is returned is the timing of (4e), and if expression (2) is not satisfied, this timing is reversed according to a processor, which is contrary to Requirement 2.

Here, expression (1) indicates that the bus occupation time must be made more than a specific time, or that a restriction imposed on the bandwidth of the shared memory space, and expression (2) indicates that the time for writing data to the shared memory cache and the shared memory must be kept above a specific time considering that the timing of (4d) fluctuates among processors even if an effort is made to shorten the time for writing data into the shared memory cache and the shared memory and to increase the bandwidth. As seen from these examples, since conditions are attached to the timing of various operations, the control of coherency creates a sort of restriction in itself when an effort is made to shorten the processing time and to improve the performance of the system.

Patent Document 1 is available as a conventional technology for securing coherency among cache memories. In Patent Document 1, a processor module has a cache memory, and issues a coherency transaction to other processor modules via a bus. The processor modules which have received the coherency transaction perform an examination of coherency. When data update is implemented to maintain the coherency, the data to be used for data update is transmitted via the bus. A signal line connecting the processor modules and the main memory is used to provide notification of the results of the examination of coherency.

Patent Document 1: Kokai (unexamined patent publication) No. 7-281956

SUMMARY OF THE INVENTION

The purpose of the present invention is to provide a multi-processor system which minimizes the factors which decrease the performance of the system due to the various restrictions including the control of coherency solves the above-mentioned problems and improves both the bandwidth of a shared memory space and latency.

The multi-processor system of the present invention comprises a dedicated line unit for exclusively transmitting and receiving data to be used for updates between a processor and shared memory in updating data in a shared memory area, as well as a global bus unit for transmitting a data update notification while arbitrating the right to transmit the data update notification to each processor, in a multi-processor system in which a plurality of processors each having a shared memory cache and at least one shared memory are connected to each other, wherein the transmission of the update notification of said data from the processor and the transmission of the data to be used for update are performed independently; each processor and the shared memory, when receiving the update notification, limit access to the address indicated by the update notification; after the data of the said address of the shared memory area is updated by the data to be used for update which has reached each processor and the shared memory, the access to the said address is permitted.

According to the present invention, an increase in speed of the transmission and reception of updated data is achieved by providing a dedicated line unit for transmitting and receiving updated data. In the global bus unit, only update notifications of data whose amount is small can be arbitrated and transferred, thus shortening the time that a processor is kept waiting to acquire the right to use the global bus. Furthermore, each processor and the shared memory have the updated data update the shared memory area in accordance with the update notification, so that the coherency between the shared memory cache and the shared memory is secured.

BRIEF DESCRIPTION OF DRAWINGS

FIG. 1 shows a conventional example of the simplest shared memory type multi-processor system.

FIG. 2 shows a conventional example in which a shared memory cache (2h) is arranged in each processor.

FIG. 3 explains the control of coherency.

FIG. 5 shows the configuration of the system based on an embodiment of the present invention.

FIG. 7 shows an example of a time chart of the processing based on a second embodiment of the present invention.

FIG. 8 shows an example of a time chart when a data update is performed in differing data sizes.

FIG. 9 shows an example of a time chart of the processing based on a third embodiment of the present invention.

FIG. 11 and FIG. 12 are the configuration diagram and time chart showing the control principle of the system in a fifth embodiment of the present invention.

FIG. 13 explains a sixth embodiment of the present invention.

FIG. 21 shows the flow of signals when write access is performed in a second embodiment of the present invention.

FIG. 23 shows the flow of signals when write access in which an update notification is omitted is performed in a third embodiment of the present invention.

FIG. 26 shows the flow of signals when a master processor transmits all data in response to the request of the transmission of all data in the cache fill operation in a fourth embodiment of the present invention.

DESCRIPTION OF THE PREFERRED EMBODIMENTS

Figure 4:
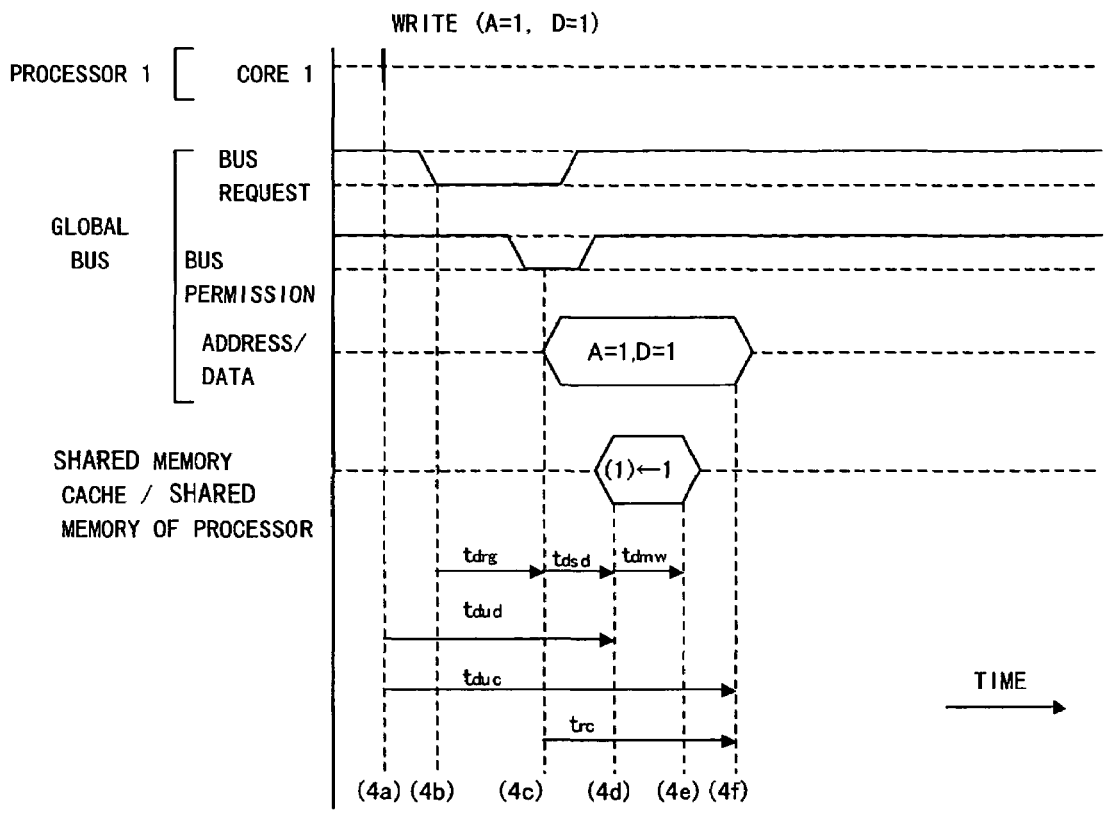
FIG. 4 explains an example of the method of establishing cache coherency.

FIG. 5 shows the configuration of the system based on an embodiment of the present invention.

Described below is the principle of the present invention in a first embodiment of the present invention. In FIG. 5, the part which corresponds to the global bus in a conventional example is an update notification bus (5e), which is used as a bus for exclusively performing a data update notification and a transmission request of updated data. The contents of the updated data are transmitted and received using a data channel (5g) between the update notification bus (5e) and a repeater (5h). The data channel is assumed to be a high-speed broadband transmission means which is already known of (for example, Gigabit Ethernet). The repeater (5h) has a function for transmitting data which appears on each port to which the data channel is connected to all the ports. If the number of processors is small, and a realistic number of data channels suffice, data channels can be provided in 1:1 between all the processors and the shared memory without providing a repeater, and the processing of transmitted data from each processor can be performed. Furthermore, the shared memory can be arranged on a specific processor, or if each processor has a shared memory cache equivalent to the size of the shared memory space, the shared memory itself may not be provided, as shown in the example of Kokai (unexamined patent publication) No. 2002-126212. In any case, it is possible to achieve the effect of the embodiment of the present invention.

When write processing is issued to the shared memory space by the processor core, each processor acquires an update notification bus and transmits an address to be updated to the update notification bus. At the same time, each processor inputs updated data into the transmission buffer of the data channel. The updated data receives a signal processing delay mainly in each processor and at the port of the repeater, and reaches the other processors later than the update notification.

All the processors constantly monitor the update notification bus, and any processor, when detecting an update notification, writes the said address into the update queue on the processor. After that, when updated data arrives, the processor writes the updated data into the shared memory cache, and deletes the said address from the update queue. When read processing for an address in the update queue is started by the processor core, the processor reserves the read from the shared memory cache, and performs the processing of writing updated data into the shared memory cache when updated data arrives, and the processing of transmitting the data back to the processor core. Here, all the addresses stored in the update queue are the objects to be monitored, and an address of a write destination is added to the updated data. Consequently, the addresses in the update queue and the address added to the updated data are compared in each processor, and the updated data can be written to an appropriate address of the shared memory cache. The configuration of the shared memory is basically the same as the configuration of the processor, but no processor core exists in the shared memory, and the shared memory cache is a shared memory chip whose capacity is larger than that of the shared memory.

Read access when there is no effective data in the shared memory cache, i.e. when a cache error occurs, is performed by issuing an updated data transmission request to the update notification bus and transmitting updated data by the processor which holds the shared memory or other effective data in the shared memory cache.

Figure 6:
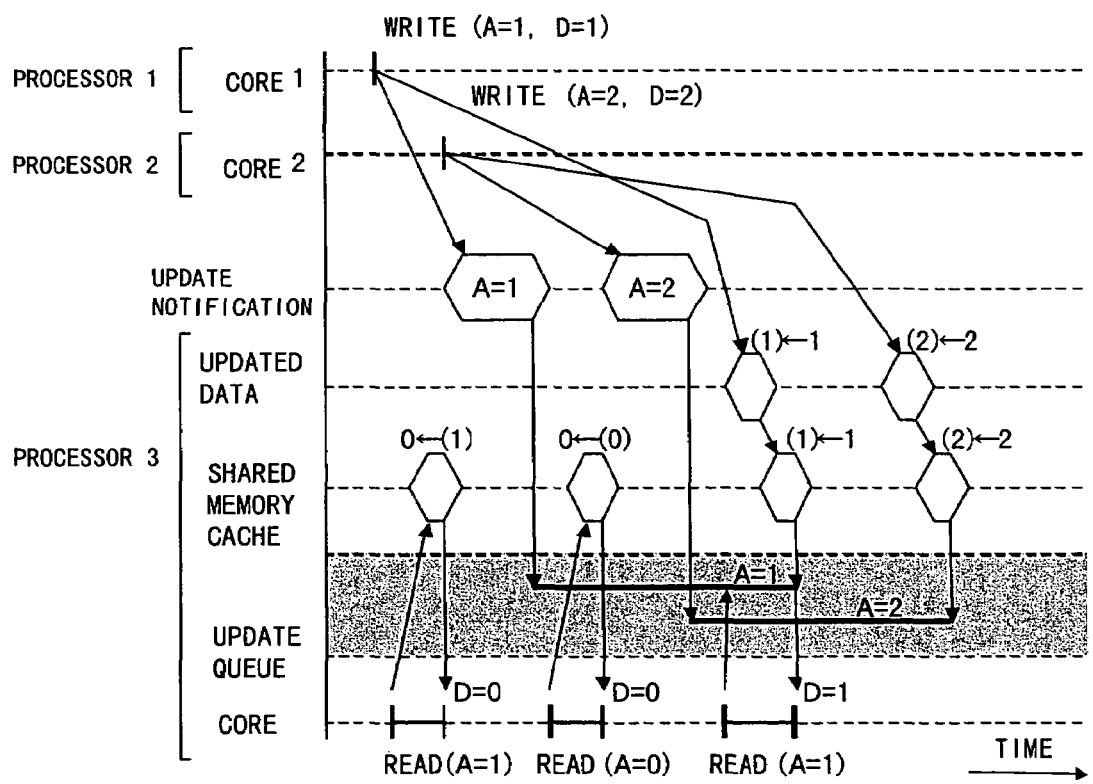
FIG. 6 shows an example of a time chart based on a series of processes in a first embodiment of the present invention.

FIG. 6 shows an example of a time chart based on a series of processes in a first embodiment of the present invention.

In this example, processor 1 writes data 1 to address 1, and processor 2 successively writes data 2 to address 2, and in parallel with this, processor 3 reads the shared memory space in the order of address 1, address 0, and address 1. The initial value of the data in the shared memory space is assumed to be 0. In FIG. 6, A means address, D means data, the indication (1)←0, etc. means writing data 0 to address 1, and the indication 1←(0), etc. means reading data 1 from address 0.

When processor 3 performs the first read, the update queue is empty, so the read is performed from the shared memory cache, and data 0 is returned to the processor core. Then, processor 3 detects an update notification from processor 1, and the update notification is inputted into the update queue of processor 3. When processor 3 performs the second read, the update queue is not empty, but only address 1 is on the update queue, and there is no address which conforms to the read address, so data 0 is returned to the processor core by the same processing as the first read. When processor 3 performs the third read, there is an address which conforms to the read address on the update queue, so the read of the shared memory cache is not started and read access is retained. Next, when updated data of address 1 arrives from processor 1, data 1 is written into the shared memory cache of processor 3, and the update queue is cleared, and at the same time the data is returned to the processor core as the read data of address 1.

The main advantages of this method are the following two points. One is that in a processor in which data update is performed, it is not necessary to wait for the reflection of the other processors to the shared memory cache, so that bus occupation time can be reduced and the bandwidth of the shared memory space can be improved. The other is that average latency of read access can be reduced by eliminating the unnecessary waiting time of read accesses which do not contend with data update processing. The degree of improvement of the latter against a conventional example changes according to the hit rate of the shared memory cache and the occurrence probability of access competition, but the higher the hit rate is and the lower the competition occurrence probability is, the more remarkable the superiority of this method becomes.

The principle in the first embodiment of the present invention is to further expand the bandwidth of the shared memory space by making the unit of data updates in the first embodiment a block of data. In the implementation which is usually conceivable, the bandwidth of the data channel and the shared memory cache can be made much larger than that of the update notification bus. Consequently, there is a possibility that the bandwidth of the shared memory space is limited by the bandwidth of the update notification bus, and cannot fully use the bandwidth of the data channel and the shared memory cache. The purpose of the first embodiment of the present invention is to solve this problem.

FIG. 7 shows an example of a time chart of the processing based on a second embodiment of the present invention.

In FIG. 7, data update is performed every four addresses. The update notification which processor 1 and processor 2 transmit is transmitted by indicating the top of the address to be updated, and updated data of the corresponding address is transmitted as a block of data.

If a data update is performed with a fixed data length, data updates including a group of data which are not required because of software processing must sometimes be performed, so that there is a possibility that the data channel and the bandwidth of the shared memory cache are wasted and the effective bandwidth is reduced. Thus, the system is configured so that the updated data size may be variable and only necessary and sufficient data may be transmitted to the data channel.

FIG. 8 shows an example of a time chart when data update is performed in differing data sizes. In FIG. 8, the difference from the example shown in FIG. 7 is that the first write of processor 1 has an update size of 2. The occupation time of the data channel and the shared memory cache decreases due to this difference by the time required for receiving the data of two addresses as a whole. Since the arrival of updated data corresponding to the write processing of processor 2 becomes faster by that time, and the time required until the contents of the update queue are cleared becomes shorter by that time, latency during access competition can be reduced by this principle.

The method in the second embodiment is the means not only for improving the bandwidth but also for providing exclusive data update in blocks in the shared memory space. In this respect, it is possible to improve the efficiency of software processing and the processing capability of the system. In order to realize the same result by means of software, extra processing is required to manage the start and end of the processing.

The principle of a third embodiment of the present invention is that a processor makes it possible to select the attribute of whether the control of coherency is necessary or not in every write access, does not issue an update notification of write accesses for which the attribute of the control of coherency is designated as not necessary, and controls transmitting only updated data to the other processors. There are some uses of the shared memory space for which the guarantee of coherency is not required according to the processing contents of software. Thus in this embodiment software uses this control for such processing, decreases the frequency of using an update notification bus, improves the bandwidth of the shared memory space, shortens the time in which updated data is reflected to the other processors, and restrains the increase of latency due to the occurrence of unnecessary access competition to a necessary minimum to decrease the average latency of read accesses.

FIG. 9 shows an example of a time chart of the processing based on a third embodiment of the present invention.

The access pattern of a processor in this example is equivalent to that of the example shown in FIG. 6, and the difference from FIG. 6 is only that an attribute of the control of coherency not being necessary is given to the first write of processor 1. Since the processing on the update notification bus following the first write of processor 1 is not started, the occupation time of the update notification bus is reduced by the time required for that. Furthermore, the update notification by processor 2 following the second write access is transmitted to the update notification bus faster by the said time, so the update time can be shortened. The third read of processor 3 is issued later than the write of processor 1, but since the third read of processor 3 is not inputted to the update queue because of this control, no waiting due to competition occurs, and read access is completed at the same latency as usual.

The principle in a fourth embodiment of the present invention is that when an expansion processor is added on line, the processor or shared memory which holds all data in the shared memory space transfers the data in the shared memory space to the expansion processor using the time when the data channel is empty, and the expansion processor receives the data and initializes the shared memory cache.

In the processor immediately after being added the contents of the shared memory cache is all invalid data, and if the invalid data is made available to the working system as it is, all access to the shared memory space mishits in the shared memory cache. As a result, not only is the processing capability of the added processor greatly reduced immediately after the operation is started, but also the other processors are affected as the update notification bus and the data channel are carelessly occupied, and there is a risk of greatly reducing the performance of the system. By this method, however, it is possible to prevent the reduction of the processing capability of the working system due to the addition of the processor and to increase the processing capability of the expansion processor to a maximum immediately after operation is started.

Figure 10:
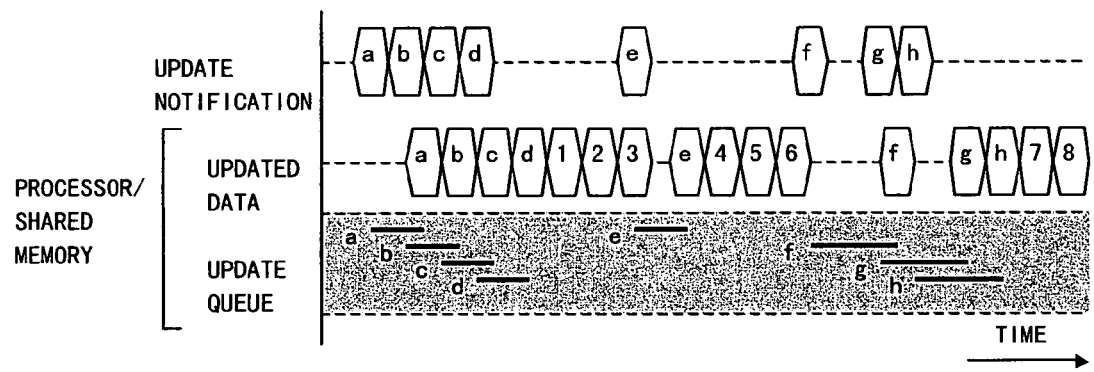
FIG. 10 shows an example of a time chart based on the principle of a fourth embodiment of the present invention.

FIG. 10 shows an example of a time chart based on the principle of a fourth embodiment of the present invention. In FIG. 10, a to h indicate data transfer based on ordinary data update processing, and 1 to 8 indicate data transfer to an expansion processor based on this method. The expansion processor either transmits a specified signal indicating that the said processor itself has been mounted in the system to the update notification bus, or notifies the other processors that the said processor itself has been mounted in the system by means of methods such as the method of using a dedicated signal line indicating whether the said processor has been mounted or not. The processor or shared memory which transmits data to the expansion processor receives the notification, and transmits updated data to the data channel when the update queue of the processor is empty, as shown in FIG. 10. When the update queue is not empty, the said processor or the shared memory suspends the transmission of data immediately and performs ordinary processing preferentially, and resumes data transmission when the update queue becomes empty. By performing such processing as this, it is possible to add the processing of transmitting data for filling up the shared memory cache to the expansion processor without affecting the timing of ordinary data update processing performed on the system. The expansion processor, after being filled up by all the data received from the data channel, begins its own processing and participates in the working system. At that time, all the contents of the shared memory cache have been updated, and the hit rate of the shared memory cache can be kept high immediately after operation is started and thenceforth, and the processing capability of the system can be improved.

Figure 12:
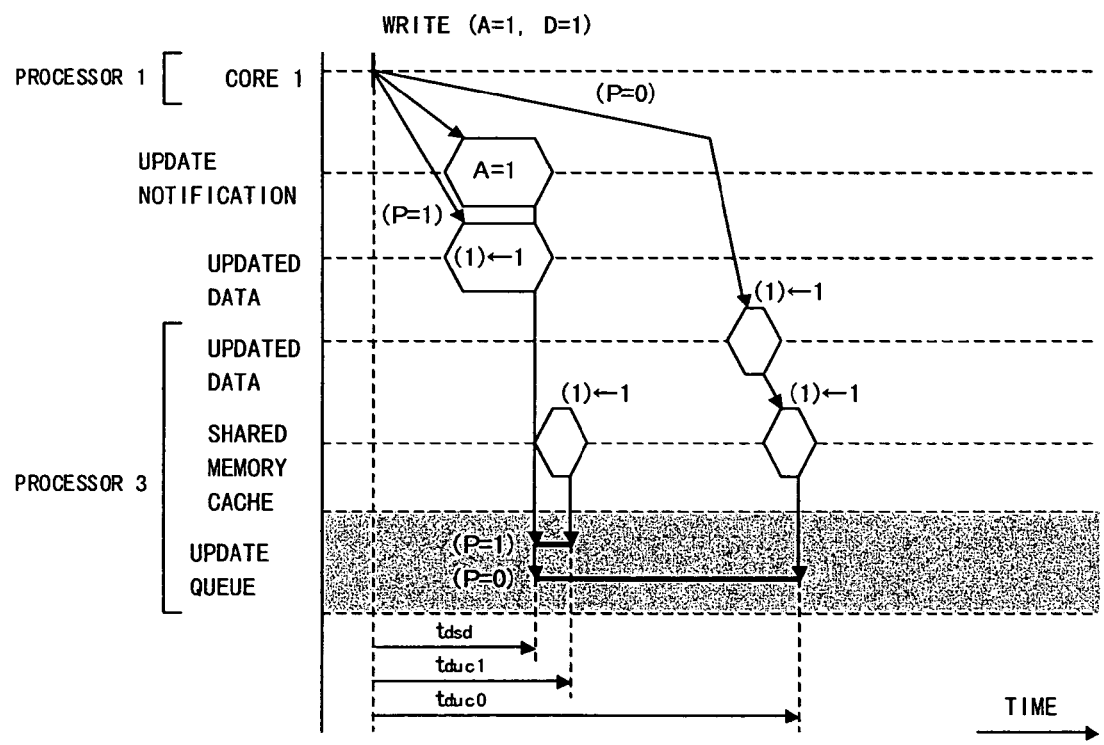

FIG. 11 and FIG. 12 are the configuration diagram and time chart showing the control principle of the system in a fifth embodiment of the present invention.

The control principle of a fifth embodiment is that the same method as a conventional method can be selectively used for the processing of performing writes to a specific address whose competition frequency is high so that latency of read access during competition may be reduced. Whether the data channel (11g) or the data bus (11i) should be used as the same arbitration logic path as the update notification bus is chosen by the processor each time a write access is performed by providing a data bus (11i) for transferring updated data, as shown in FIG. 11.

FIG. 12 shows the difference of the timing between the case (P=0) in which the data channel is used as the transfer path of updated data and the case (P=1) in which the data bus is used as the transfer path of updated data, in write accesses which are issued at the same time. The time required from the start of a write access to the time when the other processors do not read the data before being updated is $t_{dsd}$, and there is no difference between the two cases. In the case of (P=1), however, the time required until the data, after being updated, can be read is $t_{duc1}$, and in the case of (P=0), the time required until the data, after being updated, can be read is affected by the latency of the data channel and increases to $t_{duc0}$. As far as no read access competition for the same address occurs, this difference does not affect the read access at all, but when read access competition occurs, this time difference is apparent as the increase of latency of read access, so (P=0) is selectively used for accesses in which competition occurs frequently. Thus, the average latency of read access can be reduced.

FIG. 13 shows a sixth embodiment of the present invention. FIG. 13(a) is a time chart showing the control in the sixth embodiment.

In the sixth embodiment, the control principle of the fifth embodiment as it is is applied to the system configuration in the first to fourth embodiments, and data update is performed for specific write accesses without transferring updated data physically. Specifically, an address in the shared memory space and data to be written are associated with a specific address which the processor core produces in advance, and when write access is issued to the specific address, the reserved data is deemed to have been transferred as updated data at the moment when the update notification is issued. In this method, only data having a small amount of information can be handled, but it is possible to achieve the same effect as the method of the fifth embodiment without installing a conventional type of data bus in which the number of signal lines is large.

In the example shown in FIG. 13(a), a write to address 1 is treated as a write of data 1 to the same address in the shared memory space. When an update notification is recognized, updated data is deemed to have been transmitted at the same time, so that it is possible to perform the processing at the same timing as (P=1) in the fifth embodiment. Moreover, since no data channel occupation occurs, if there is any subsequent access, an effect of reducing the latency related to that access can be obtained.

In the example shown in FIG. 13(a), for example, if a rule of treating write to address 2 as write to address 1 is provided and used together, the overhead of access competition is small, and the function of a high-speed binary flag in terms of the time of reflection to the other processors can be provided to software (FIG. 13(b)).

Figure 14:
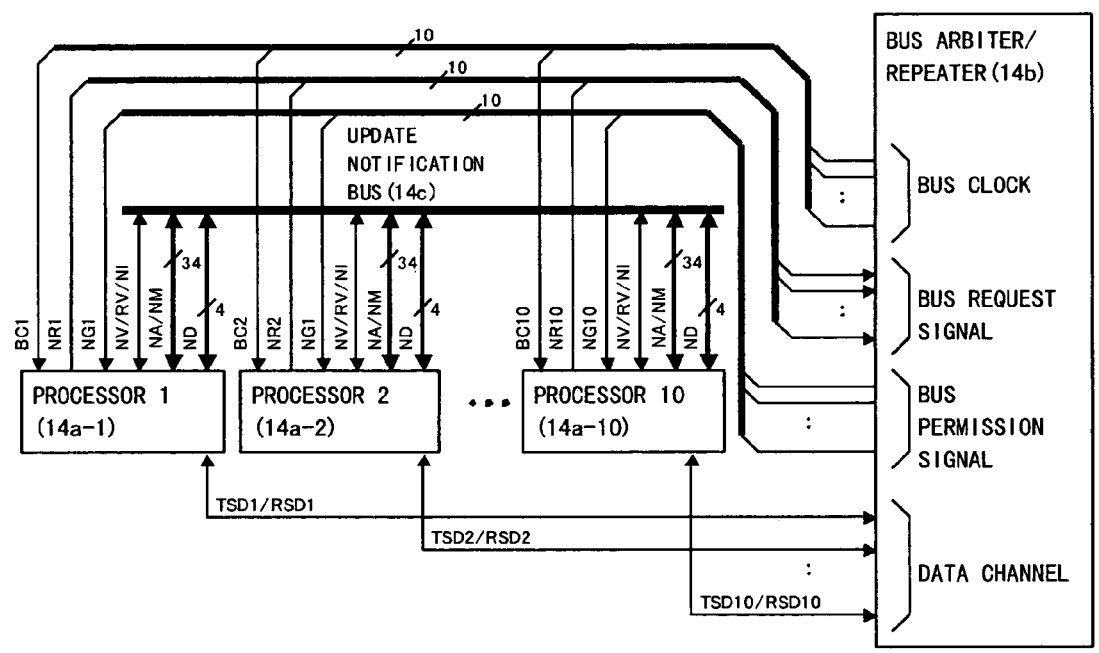
FIG. 14 shows a more detailed configuration of the system based on an embodiment of the present invention.

FIG. 14 shows a more detailed configuration of the system based on an embodiment of the present invention.

The system comprises ten processors, (14a-1) to (14a-10), and a bus arbiter/repeater (14b). The bus arbiter/repeater provides an entirely independent function, but contains the two blocks in the same unit to make the system configuration easy. The update notification bus (14c) comprises bus clocks BC1 to BC10, bus request signals NR1 to NR10, bus permission signals NG1 to NG10, an update notification address NA (30 bits), an update notification address mask NM (4 bits), instant update data ND (4 bits), an update notification signal NV, an update data request signal RV, and an instant update attribute signal NI, and operates in synchronization with the BCs. The data channels TSD1 to TSD10, and RSD1 to RSD10 use a full duplex communication channel in which serial transmission lines having a transmission bandwidth of about 3 giga-bits face each other. At least two processors out of all the processors hold all the contents of the shared memory space, and one of the two responds to an update data request as a master processor.

Figure 15:
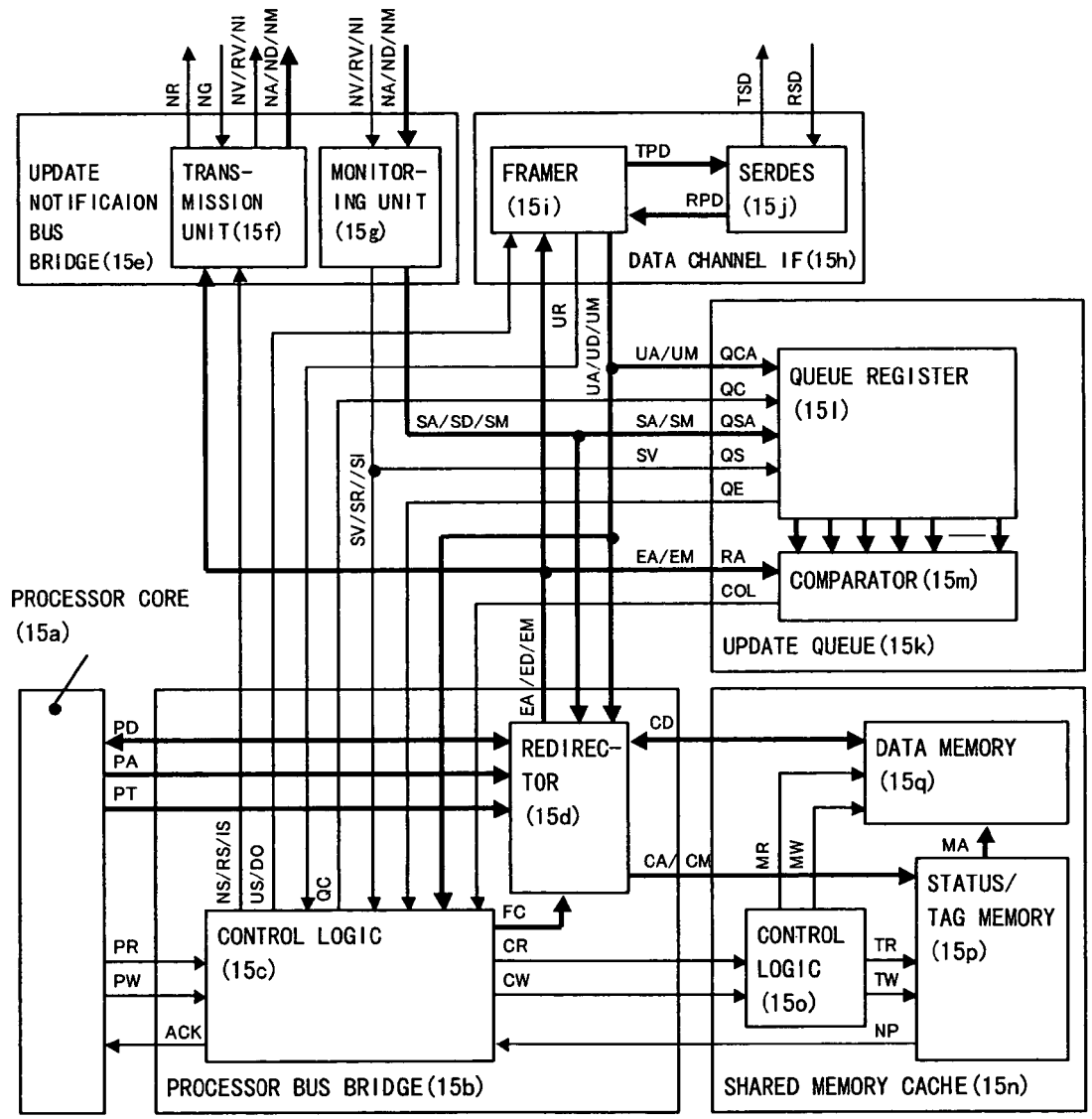
FIG. 15 shows the internal configuration of each processor (14a-1) to (14a-10) shown in FIG. 14.

FIG. 15 shows the internal configuration of each processor (14a-1) to (14a-10) shown in FIG. 14.

The functional blocks in the processor are largely divided into a processor core (15a), processor bus bridge (15b), update notification bus bridge (15e), data channel IF (15h), update queue (15k) and shared memory cache (15n). The function of each unit is described below.

(15a) Processor core is the main processing unit.

(15b) Processor bus bridge comprehensively controls access to the shared memory space.

(15c) Control block controls the whole of a processor.

(15d) Redirector converts addresses and data with the bus switching between the functional blocks.

(15e) Update notification bus bridge controls the update notification bus.

(15h) Data channel IF transmits and receives updated data between the processors.

(15k) Update queue contains the update queue, and outputs the state of the queue to external entities.

(15n) Shared memory cache holds data in the shared memory space, and provides high-speed access to the processor core.

Figure 16:
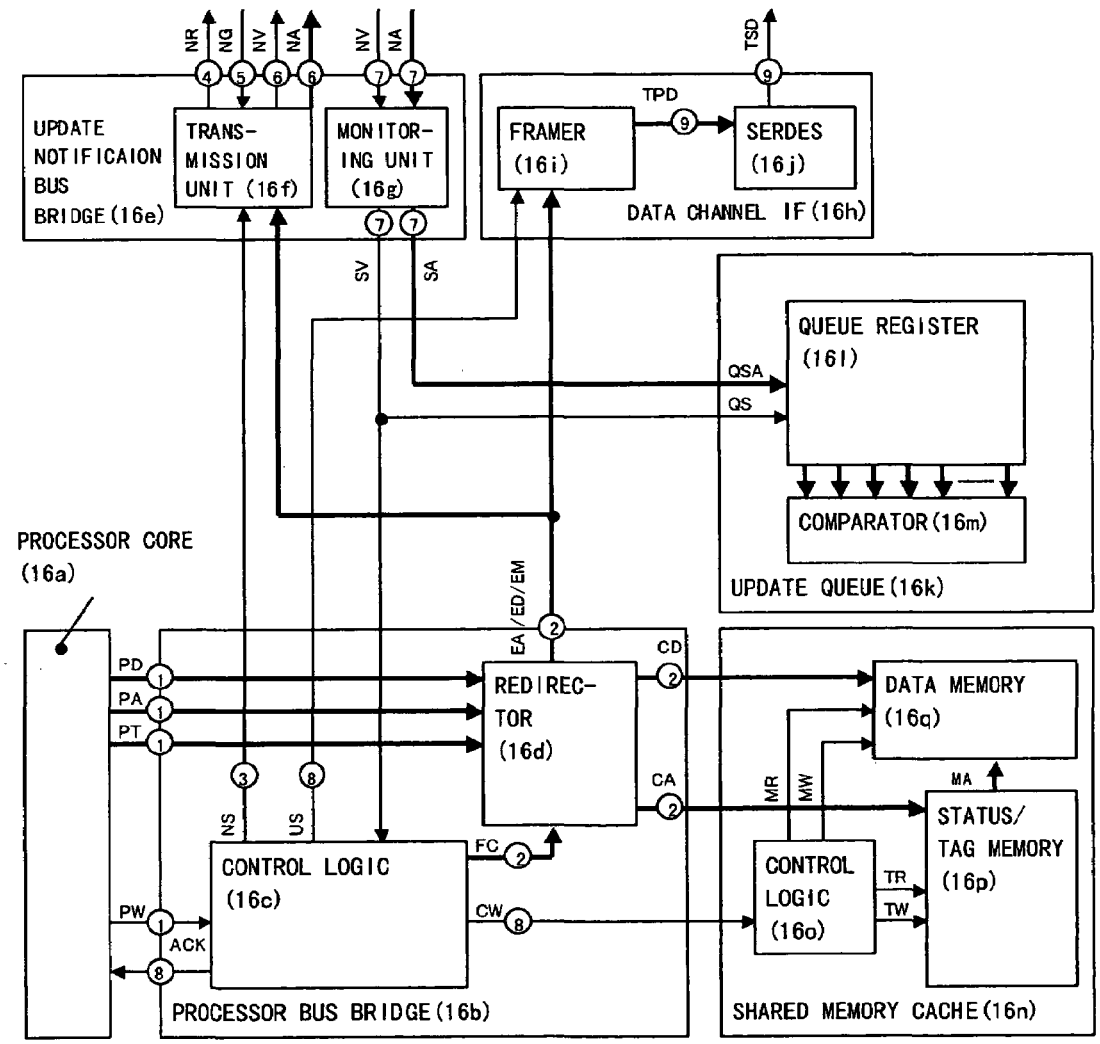
FIG. 16 shows the flow of signals when write access is performed in a first embodiment of the present invention.

FIG. 16 shows the flow of signals when write access is performed in a first embodiment of the present invention. The flow is described below. The number assigned to each of the following flows corresponds to the number assigned to each signal shown in FIG. 16.

(1) The processor core (16a) sets a processor address PA, processor data PD and a processor transfer type PT, and transmits a processor write signal PW.

(2) The control logic (16c) in the processor bus bridge (16b) sets a redirector function control signal FC. The redirector (16d) echoes the processor address PA to an effective address EA and a cache address CA, and the processor data PD to effective data ED and cache data CD accordingly.

(3) The control logic (16c) in the processor bus bridge (16b) transmits an update notification transmission signal NS.

(4) The transmission unit (16f) in the update notification bus bridge (16e) receives NS, and transmits a bus request signal. NR.

(5) The transmission unit (16f) in the update notification bus bridge (16e) receives a bus permission signal NG, and acquires the update notification bus.

(6) EA is echoed to the update notification address NA, and the update notification signal NV is transmitted to all the processors. NA and NV are looped back to the monitoring unit (16g) in the update notification bus bridge (16e) of the same processor, and are received.

(7) When the monitoring unit (16g) in the update notification bus bridge (16e) receives the NV which it has sent, the monitoring unit (16g) echoes the NV as an update notification address SA, and transmits the NV to itself internally as an update notification reception signal SV. After the SV is received, the update notification is queued to the queue register (16l) in the update queue (16k). At that time, the same control is also performed on the other processors.

(8) The control logic (16c) in the processor bus bridge (16b) receives SV, and transmits an updated data transmission signal US. The framer (16i) in the data channel IF (16h) which receives US queues the contents of EA/ED to the transmission buffer. After US is transmitted, an acknowledge signal ACK is transmitted to the processor core, and access on the processor side is completed.

(9) In the framer (16i) in the data channel IF (16h), data which is queued to the transmission buffer is constructed as a packet at all times, and the data is transmitted to SERDES (16j) (which is an abbreviation of SERIALIZER and DESERIALIZER, and which is a functional block for converting a serial signal into a parallel signal, or for converting a parallel signal into a serial signal) as transmission parallel data TPD each time the construction is completed. The SERDES receives the transmission parallel data TPD, and modulates an electric signal which can be conveyed by the data channel, and transmits updated data as the transmission serial data TSD.

Figure 17:
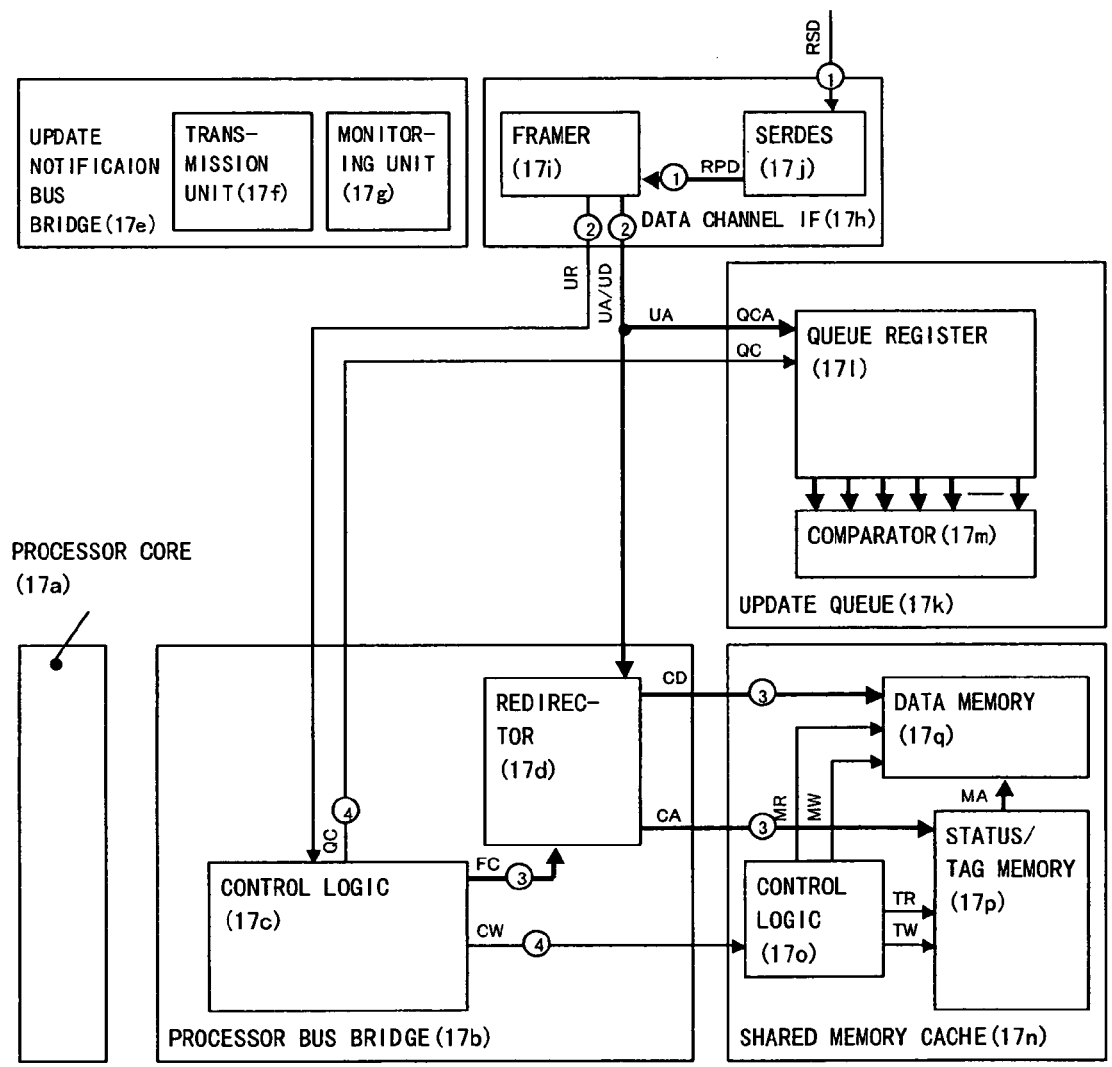
FIG. 17 shows the flow of signals when updated data is received based on a first embodiment of the present invention.

FIG. 17 shows the flow of signals when updated data is received based on a first embodiment of the present invention. The flow is described below. The number assigned to each of the following flows corresponds to the number assigned to each signal shown in FIG. 17.

(1) The SERDES (17j) in the data channel IF (17h) demodulates the received serial data RSD, and transmits it to the framer (17i) as received parallel data RPD.

(2) The framer (17i) in the data channel IF (17h) receives RPD, extracts and decompresses a packet in the data, sets an updated data address UA and updated data UD, and transmits an updated data receiving signal UR. At the same time, UA is set in the queue clear address in the queue register (17l).

(3) The control logic (17c) in the processor bus bridge (17b) receives UR, and sets a redirector function control signal FC. The redirector (17d) echoes UA to CA and UD to CD accordingly. If any other processing is being performed in the control logic (17c), the redirector waits once, and as soon as the processing is completed, the redirector performs said processing.

(4) The control logic (17c) in the processor bus bridge (17b) transmits a cache write signal CW, and the shared memory cache (17n) which receives CW updates the desired data designated by CA in CD. The control logic (17c) transmits a queue clear signal QC, and the update queue (17k) which receives QC clears QCA set in (2) from the queue register (17l).

Figure 18:
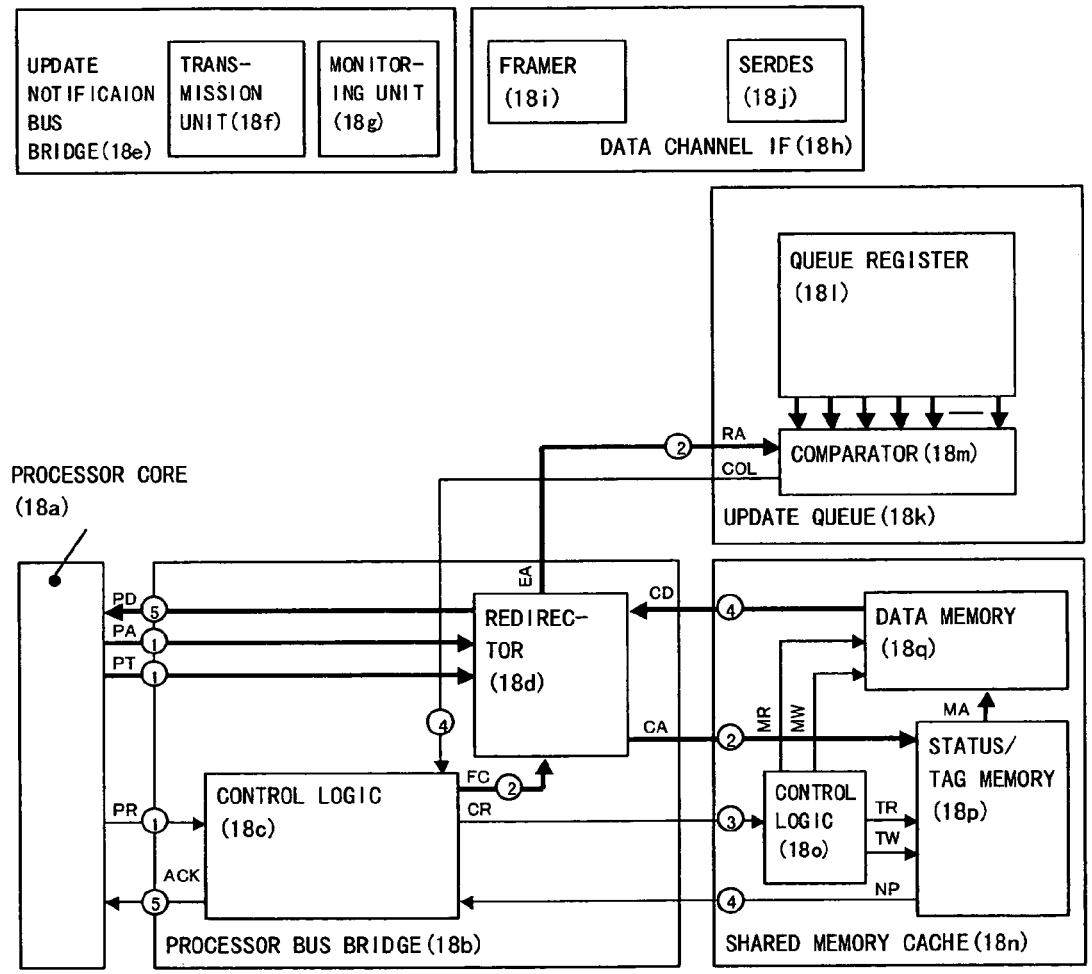
FIG. 18 shows the flow of signals when a typical read access in which data of a shared memory cache can be used is performed in a first embodiment of the present invention.

FIG. 18 shows the flow of signals when a typical read access in which data of a shared memory cache can be used is performed in a first embodiment of the present invention. The flow is described below. The number assigned to each of the following flows corresponds to the number assigned to each signal shown in FIG. 18.

(1) The processor core (18a) sets PA and PT and transmits a processor read signal PR.

(2) The control logic (18c) in the processor bus bridge (18b) sets FC, and the redirector (18d) echoes PA to EA and CA accordingly.

(3) The control logic (18c) in the processor bus bridge (18b) transmits CR.

(4) The shared memory cache (18n) receives CR, and transmits an unusable signal NP when data on the cache designated by CA cannot be used, and transmits CD when data on the cache designated by CA can be used. The comparator (18m) in the update queue (18k) transmits a competition signal COL when a queue designated by EA is on the queue register.

(5) When the control logic (18c) in the processor bus bridge (18b) receives neither NP nor COL, the control logic echoes CD to PD, transmits ACK, and then the access is completed. The control logic, when receiving COL, releases CR, and waits until COL is released, and performs the processing of (3) and thereafter again after COL is released. The processing when the control logic receives NP instead of COL will be described below.

Figure 19:
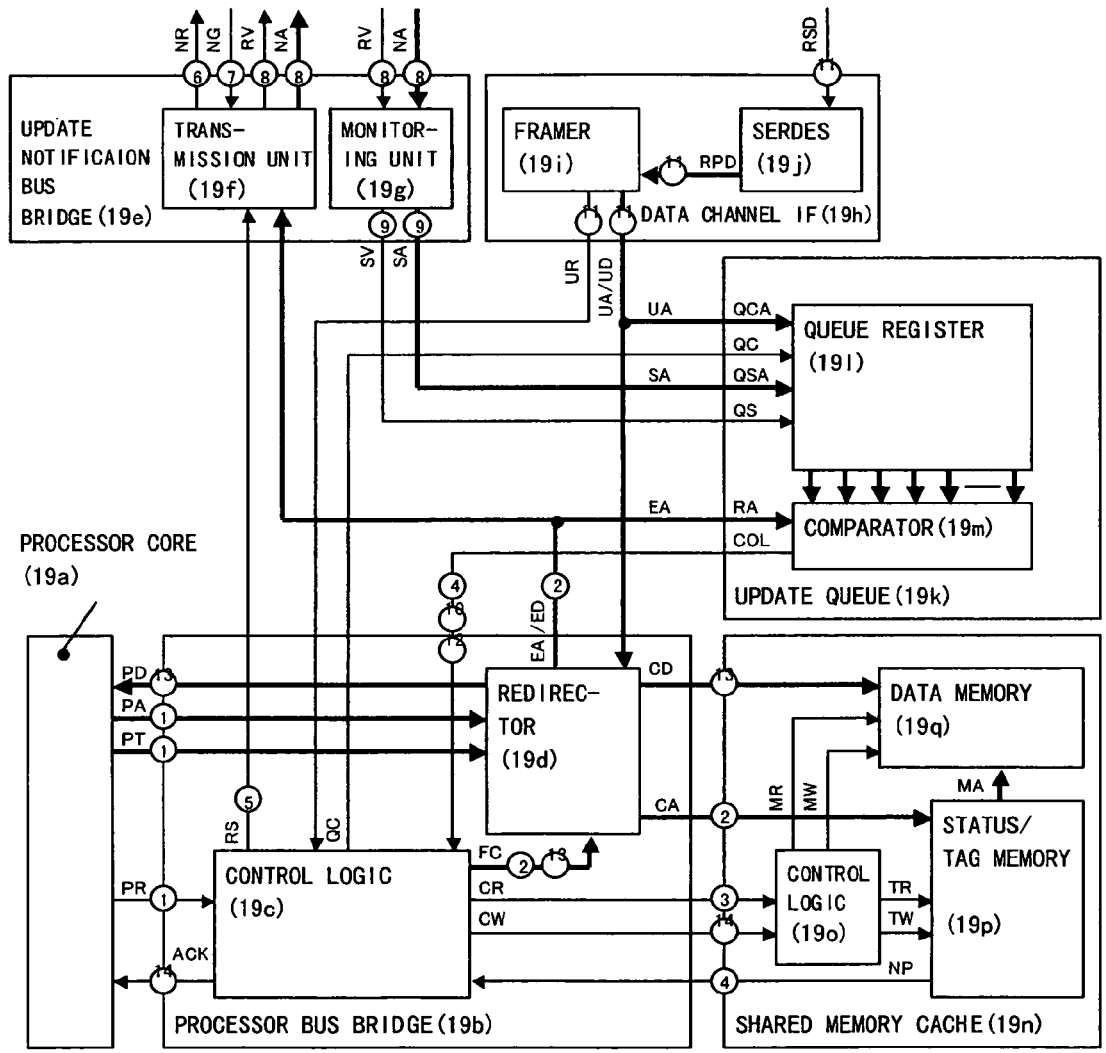
FIG. 19 shows the flow of signals when data in a shared memory cache cannot be used and updated data request processing is performed in the read access in a first embodiment of the present invention.

FIG. 19 shows the flow of signals when data on the shared memory cache cannot be used and updated data request processing is performed in the read access in a first embodiment of the present invention. The flow is described below. The number assigned to each of the following flows corresponds to the number assigned to each signal shown in FIG. 19. The flow is exactly the same as that up to (4) above, so the description of the flow up to (4) is omitted.

(5) When the control logic (19c) in the processor bus bridge (19b) does not receive COL, but receives NP, the control logic transmits an updated data request signal RS.

(6) The transmission unit (19*f*) in the update notification bus bridge (19*e*) receives RS, and transmits a bus request signal NR.

(7) The transmission unit (19*f*) in the update notification bus bridge (19*e*) receives a bus permission signal NG, and acquires the update notification bus.

(8) EA is echoed to the update notification address NA, and the updated data request signal RV is transmitted to all the processors. NA and RV are looped back to the monitoring unit (19*g*) in the update notification bus bridge (19*e*) of the same processor and are received by the monitoring unit.

(9) The monitoring unit (19*g*) in the update notification bus bridge (19*e*) echoes NA as SA, and when detecting RV which the same processor transmits, the monitoring unit RV as SV in the same processor. The update queue (19*k*) receives SV as a queue setting signal QS, and queues the contents of SA to the queue register (19*l*) as a queue address QSA.

(10) As the queue which conforms to the object of the read access is queued, COL is transmitted from the update queue (19*k*) without fail. Upon receiving COL, the processor bus bridge (19*b*) performs the processing of receiving the update notification and updated data while leaving read access from the processor core (19*a*) pending and waits until COL is released.

(11) The master processor, when receiving the updated data request signal transmitted in (8) above, transmits updated data, and the data channel IF (19*h*) sets the updated data address UA and the updated data UD, and transmits the updated data receiving signal UR. At the same time, UA is set in the queue clear address QCA of the queue register (19*l*).

(12) As the queue which is the object of the read access is cleared from the update queue (19*k*), COL is released.

(13) The control logic (19*c*) in the processor bus bridge (19*b*) receives the release of COL, controls FC the redirector (19*d*), and echoes UA to CA, and UD to CD and PD.

(14) The control logic (19*c*) in the processor bus bridge (19*b*) transmits the caches write signal CW and updates the desired data on the shared memory cache by CD, and at the same time the control logic (19*c*) transmits ACK to the processor core, and then, the read access is completed.

Figure 20:
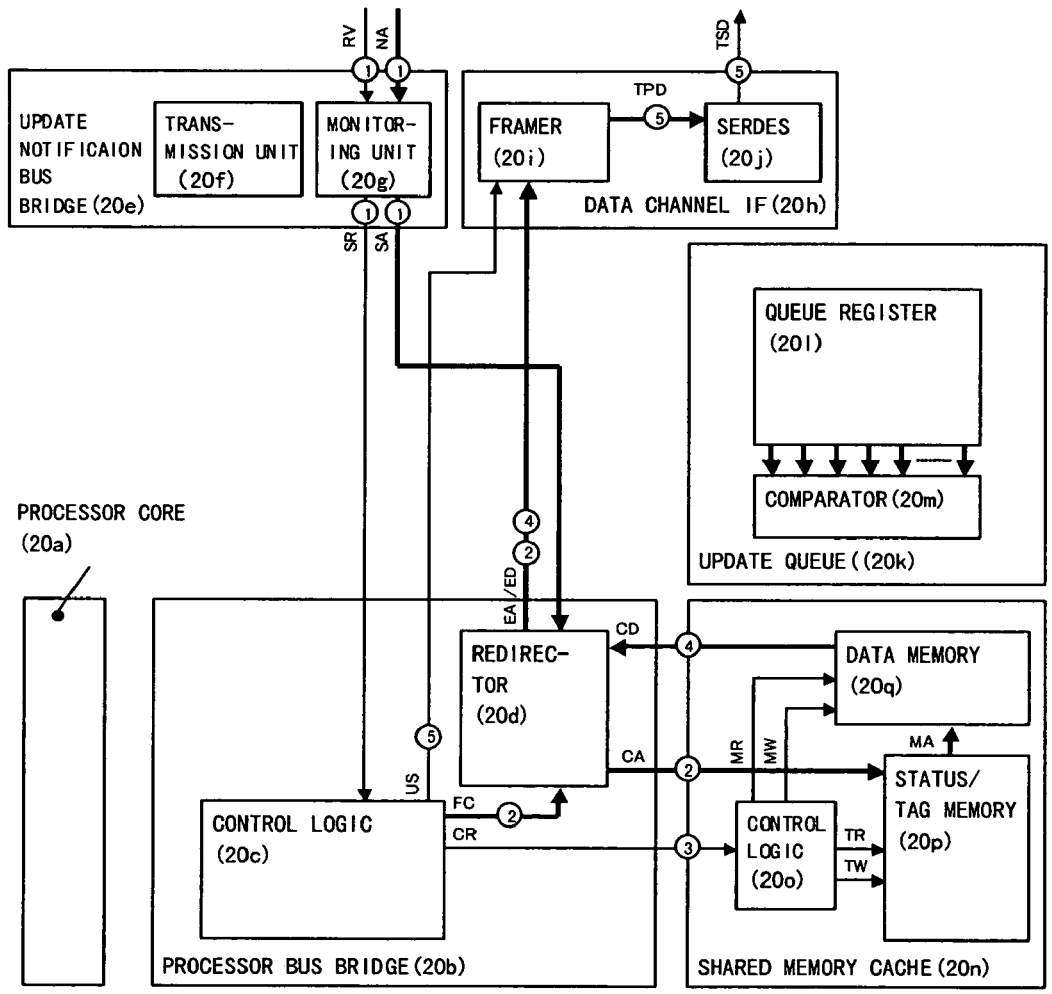
FIG. 20 shows the flow of signals when a master processor responds to the updated data request transmitted from another processor in a first embodiment of the present invention.

FIG. 20 shows the flow of signals when the master processor responds to the updated data request transmitted from another processor in a first embodiment of the present invention. The flow is described below. The number assigned to each of the following flows corresponds to the number assigned to each signal shown in FIG. 20.

(1) The monitoring unit (20*g*) in the updated notification bus bridge (20*e*), when detecting RV, echoes NA to SA, and transmits the updated data request signal SR to the processor internally.

(2) When the control logic (20*c*) in the processor bus bridge (20*b*) is the master processor, the control logic (20*c*) receives SR, sets FC, controls the redirector (20*d*), echoes SA to EA, and connects CD to ED. If the control logic (20*c*) is not the master processor, SR is neglected. When any other processing is being performed in the control logic (20*c*), the control logic (20*c*) waits, and performs the said processing as soon as the other processing is completed.

(3) The control logic (20*c*) in the processor bus bridge (20*b*) transmits CR to the shared memory cache (20*n*).

(4) CD is transmitted from the shared memory cache (20*n*), and is echoed to ED.

(5) The control logic (20*c*) in the processor bus bridge (20*b*) transmits US, and updated data is transmitted to the data channel in the same as was the processing of transmitting updated data when write access was performed.

FIG. 21 shows the flow of signals when write access is performed in a second embodiment of the present invention. The flow is described below. The number assigned to each of the following flows corresponds to the number assigned to each signal shown in FIG. 21.

(1) The processor core (21*a*) sets the processor address PA, the processor data PD, and the processor transfer type PT, and transfers the data of a plurality of sizes to the redirector by means of burst transfer.

(2) The control logic (21*c*) in the processor bus bridge (21*b*) sets the redirector function control signal FC. The redirector (21*d*) accordingly echoes the top address set by the processor address PA to the effective address EA. The redirector (21*d*) also counts the size of data transmitted by means of burst transfer, and calculates an effective address mask EM and outputs it. Here, the effective address mask means a signal indicating which bit in the lower position of the effective address should be neglected. The data of a plurality of sizes set in PD is stored in the buffer in the redirector.

(3) The control logic (21*c*) in the processor bus bridge (21*b*) transmits the update notification transmission signal NS.

(4) The transmission unit (21*f*) in the update notification bus bridge (21*e*) receives NS, and transmits the bus request signal NR.

(5) The transmission unit (21*f*) in the update notification bus bridge (21*e*) receives the bus permission signal NG, and acquires the update notification bus.

(6) EA is echoed to the update notification address NA, and EM is echoed to the update notification address mask NM, and the update notification signal NV is transmitted to all the processors. NA, NM, and NV are looped back to the monitoring unit (21*g*) in the update notification bus bridge (21*e*) in the same processor, and are received by the monitoring unit.

(7) The monitoring unit (21*g*) in the update notification bus bridge (21*e*) receives NV, echoes NA to the update setting address SA, and NM to the update setting address mask SM, and transmits the update notification receiving signal SV. The update queue (21*k*) receives SV as the queue setting signal QS, and queues the contents of SA to the queue register as the queue setting address QSA and the contents of SM to the queue register (21*l*) as the queue setting address mask QSM.

(8) The control logic (21*c*) in the processor bus bridge (21*b*), when receiving SV, transmits the updated data transmission signal US and sets FC at the same time. The redirector (21*d*) accordingly sets the updated data stored in the buffer as ED in order from its top. The framer (21*i*) in the data channel IF (21*h*), when receiving this data, queues the contents of EA, EM, and ED to the transmission buffer. After US is transmitted, the acknowledge signal ACK is transmitted to the processor core, and the access on the processor core side is completed.

(9) In the framer (21*i*) in the data channel IF (21*h*), data which is queued to the transmission buffer is constructed as a packet at all times, and the data is transmitted to SERDES (21*j*) as transmission parallel data TPD each time the construction is completed. The SERDES receives the transmission parallel data TPD, and modulates an electric signal which can be conveyed by the data channel, and transmits updated data as the transmission serial data TSD.

Figure 22:
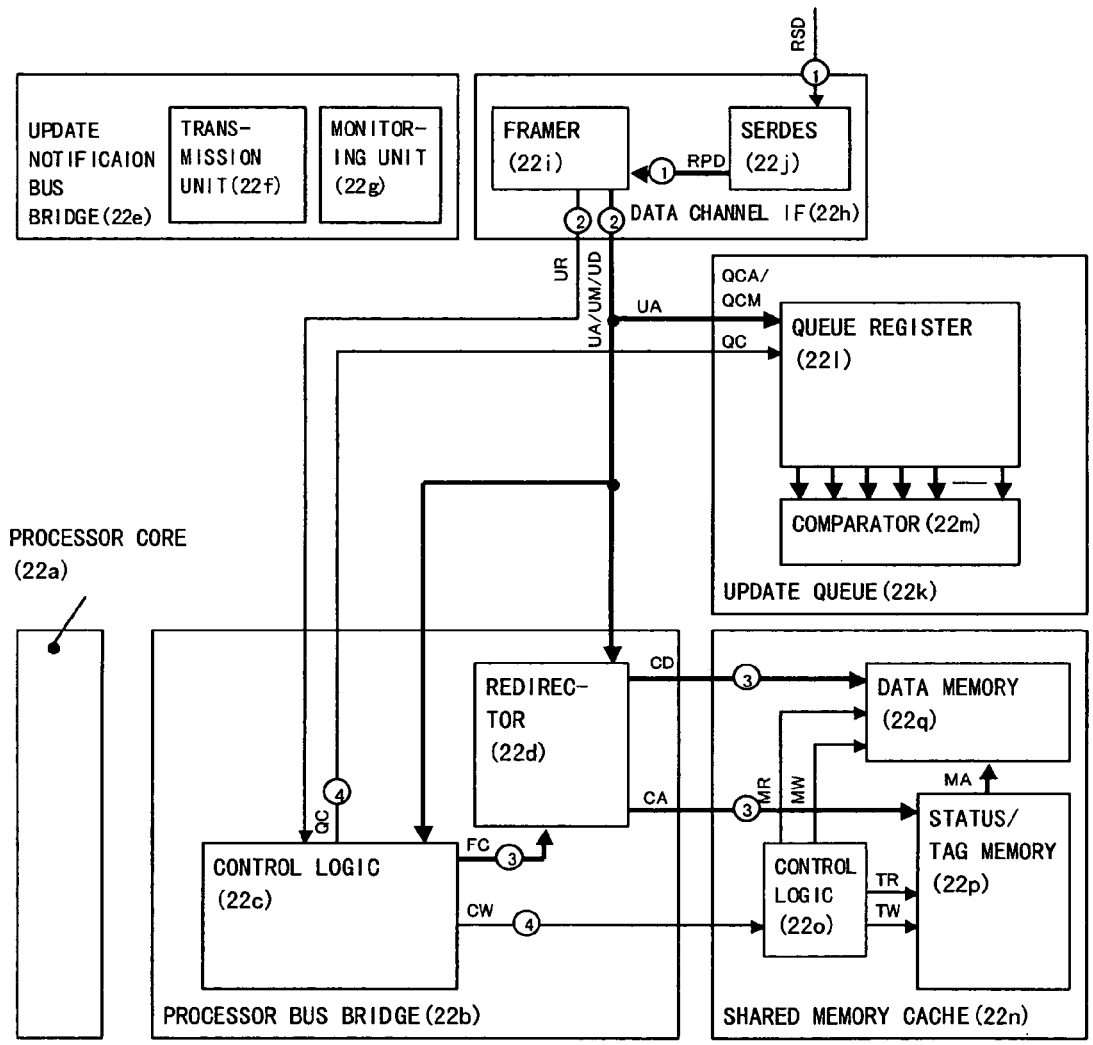
FIG. 22 shows the flow of signals when updated data transmitted from another processor is received in a second embodiment of the present invention.

FIG. 22 shows the flow of signals when updated data transmitted from another processor is received in a second embodiment of the present invention. The flow is described below. The number assigned to each of the following flows corresponds to the number assigned to each signal shown in FIG. 22.

(1) The SERDES (22*j*) in the data channel IF (22*h*) demodulates the receiving serial data RSD, and transmits it to the framer (22*i*) as the receiving parallel data RPD.

(2) The framer (22*i*) in the data channel IF (22*h*) receives RPD, extracts and decompresses a packet in the data, sets the packet in the updated data address UA and the update address mask UM, and transmits the updated data receiving signal UR. At the same time, UA is set in the queue clear address QCA in the queue register (22*l*). Upon transmitting UR, the framer (22*i*) sets updated data to UD in order from its top.

(3) The control logic (22*c*) in the processor bus bridge (22*b*) receives UR, and sets the redirector function control signal FC. UA and UD are stored once in the buffer in the redirector, and UA is set to CA, and the top data of UD is set to CD. When any other processing is being performed by the control logic (22*c*), the control logic (20*c*) waits, and performs said processing as soon as the other processing is completed.

(4) The control logic (22*c*) in the processor bus bridge (22*b*) transmits the cache write signal CW, and the shared memory cache (22*n*), when receiving CW, updates the desired data designated by CA in CD. The shared memory cache (22*n*) successively sets the next updated data stored in the buffer of the redirector in CD, and after increasing the value of CA by one, repeatedly performs the similar cache memory update processing in accordance with the set value of UM until updated data in the buffer does not exist any more. After that, the shared memory cache (22*n*) transmits the queue clear signal QC, and the update queue (22*k*), when receiving QC, clears QCA set in (2) above from the queue register (22*l*).

FIG. 23 shows the flow of signals when write access in which an update notification is omitted is performed in a third embodiment of the present invention. The flow is described below. The number assigned to each of the following flows corresponds to the number assigned to each signal shown in FIG. 23.

(1) The processor core (23*a*) sets a data only attribute in the processor transfer type PT, and transmits the processor address PA, processor data PD and processor write signal PW.

(2) The control logic (23*c*) in the processor bus bridge (23*b*) sets the redirector function control signal FC. The redirector (23*d*) echoes the processor address PA to the effective address EA and the processor data PD to the effective data ED.

(3) The control logic (23*c*) in the processor bus bridge (23*b*) sets the data only attribute signal DO, and transmits the updated data transmission signal US. After US is transmitted, the acknowledge signal ACK is transmitted to the processor core, then the access on the processor core side is completed.

(4) The framer (23*i*) in the data channel IF (23*h*), when receiving the updated data transmission signal US and data only attribute signal DO, queues the contents of EA/ED and the data only attribute to the transmission buffer.

(5) In the framer (23*i*) in the data channel IF (23*h*), the data and attribute which are queued to the transmission buffer are constructed as a packet at all times, and the data and attribute are transmitted to the SERDES (23*j*) as the transmission parallel data TPD each time the construction is completed. The SERDES receives the transmission parallel data TPD, and modulates an electric signal which can be conveyed by the data channel, and transmits updated data as the transmission serial data TSD.

Figure 24:
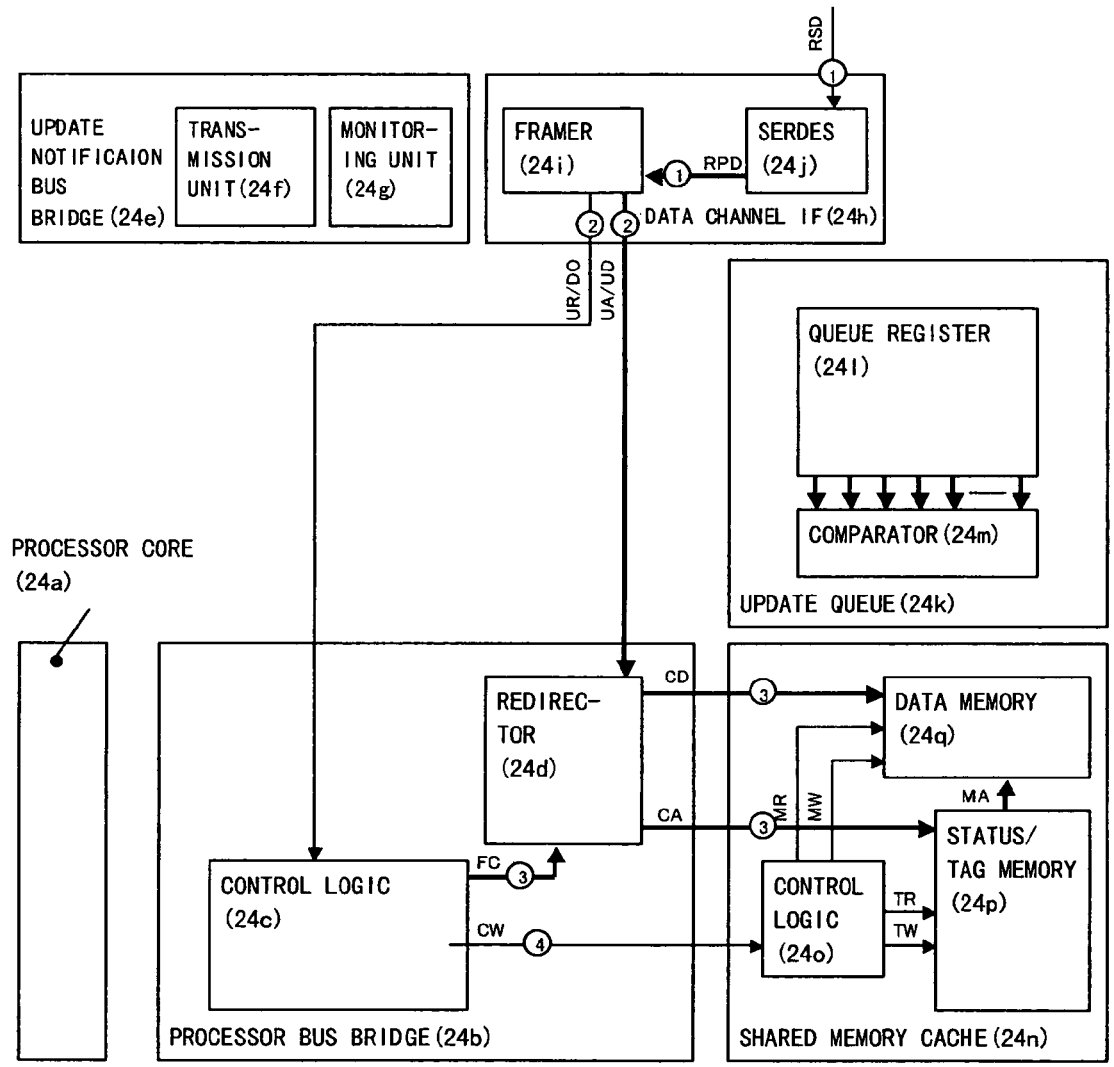
FIG. 24 shows the flow of signals when updated data in which the update notification transmitted from another processor is omitted is received in a third embodiment of the present invention.

FIG. 24 shows the flow of signals when updated data in which an update notification transmitted from another processor is omitted is received in a third embodiment of the present invention. The flow is described below. The number assigned to each of the following flows corresponds to the number assigned to each signal shown in FIG. 24.

(1) The SERDES (24*j*) in the data channel IF (24*h*) demodulates the received serial data RSD, and transmits RSD to the framer (24*i*) as received parallel data RPD.

(2) The framer (24*i*) in the data channel IF (24*h*) receives RPD, extracts and decompresses a packet in the data, sets the updated data address UA, the updated data UD, and the data only attribute DO, and transmits the updated data receiving signal UR.

(3) The control logic (24*c*) in the processor bus bridge (24*b*) receives the updated data receiving signal UR and the data only attribute signal DO, and sets the redirector function control signal FC. The redirector (24*d*) echoes UA to the cache address CA and UD to the cache data CD accordingly. If any other processing is being performed in the control logic (24*c*), the redirector waits, and as soon as the processing is completed, the redirector performs said processing.

(4) The control logic (24*c*) in the processor bus bridge (24*b*) transmits a cache write signal CW, and the shared memory cache (24*n*), when receiving CW, updates the desired data designated by CA in CD.

Figure 25:
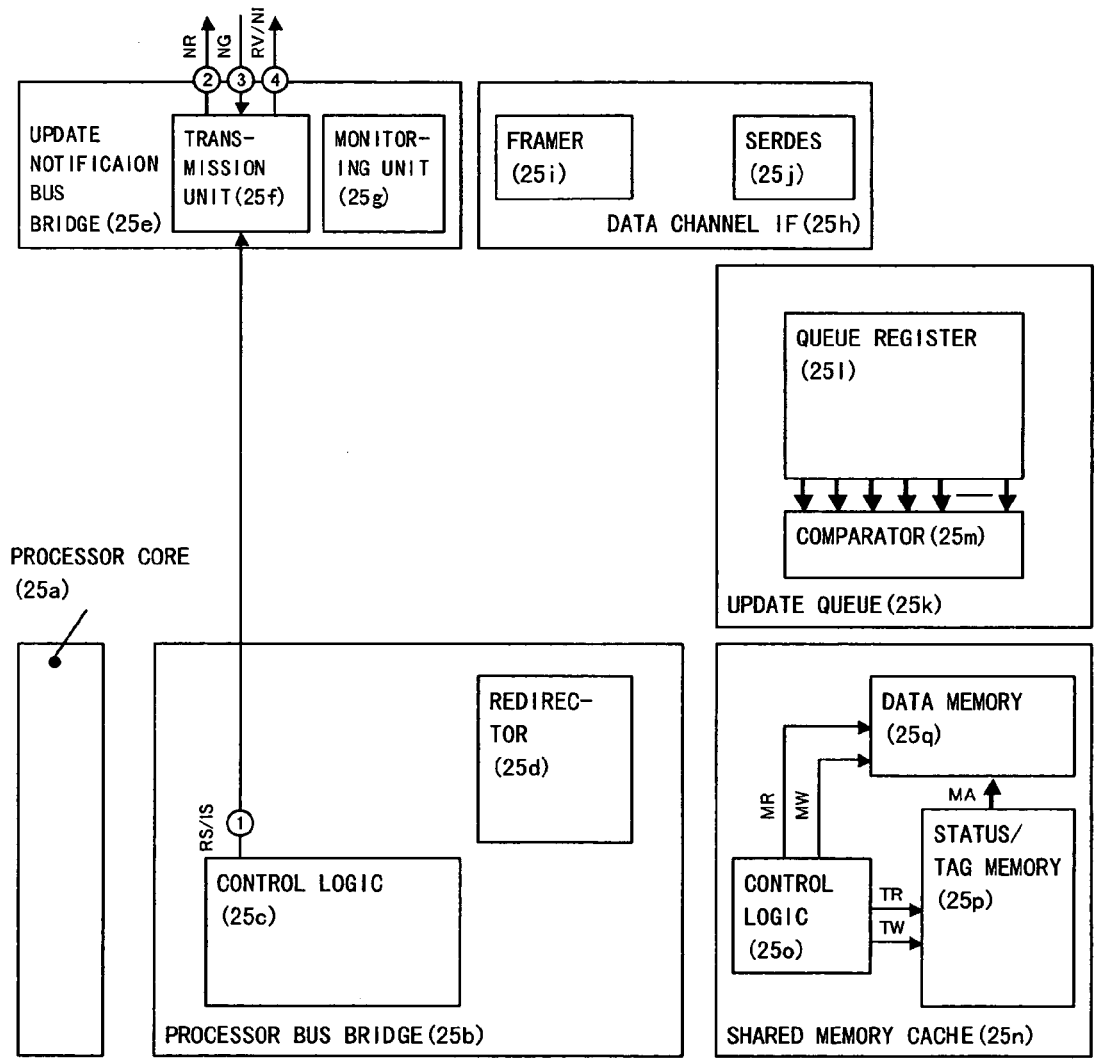
FIG. 25 shows the flow of signals when a processor which has been added to the system requests the transmission of all data in the cache fill operation in a second embodiment of the present invention.

FIG. 25 shows the flow of signals when a processor which has been added to the system requests the transmission of all data in the cache fill operation in a second embodiment of the present invention. The flow is described below. The number assigned to each of the following flows corresponds to the number assigned to each signal shown in FIG. 25.

(1) The control logic (25*c*) in the processor bus bridge (25*b*), when detecting that a similar processor has been added to the system, transmits RS and IS at the same time as the all data transmission request signals.

(2) The transmission unit (25*f*) in the update notification bus bridge (25*e*) receives RS and IS, and transmits the bus request signal NR.

(3) The transmission unit (25*f*) in the update notification bus bridge (25*e*) receives the bus permission signal NG, and acquires the update notification bus.

(4) The transmission unit (25*f*) in the update notification bus bridge (25*e*) transmits RV and NI at the same time.

FIG. 26 shows the flow of signals when a master processor transmits all data in response to the request of the transmission of all data in the cache fill operation in a fourth embodiment of the present invention. The flow is described below. The number assigned to each of the following flows corresponds to the number assigned to each signal shown in FIG. 26.

(1) The monitoring unit (26*g*) in the update notification bus bridge (26*e*) of the master processor, when receiving RV and NI at the same time, transmits SR and SI at the same time.

(2) The control logic (26*c*) in the processor bus bridge (26*b*), when receiving SR and SI at the same time, interprets that SR and SI are all data transmission request signals, and stores the top address in the shared memory space as the transmission commencement address and the next transmission address.

(3) Another processor is added to the system, and when the control logic (26*c*) in the master processor receives the all data request signal again, the control logic (26*c*) stores the next transmission address which was stored before as the transmission commencement address.

(4) When an queue empty signal QE is in effect, and there is no other requested processing, the control logic (26c) sets the redirector function control signal FC, and the redirector (26d) sets the next transmission address which has been stored in advance in the cache address CA, and the control logic (26c) transmits the cache read signal CR.

(5) The shared memory cache (26n) receives CR, and transmits data in the cache designated by CA to the cache data CD.

(6) The redirector (26d) in the processor bus bridge (26b) sets CA which has been set in advance to the effective address EA as well, and echoes CD to the effective data ED. The control logic (26c) sets the data only attribute DO, and transmits the updated data transmission signal US. The framer (26i) in the data channel IF (26h), when receiving US, queues the contents of EA/ED and the data only attribute to the transmission buffer.

(7) The control logic (26c) in the processor bus bridge (26b) stores the address next to a transmitted address as a next transmission address. When the transmitted address reaches the last address in the shared memory space, the control logic (26c) stores the top address in the shared memory space as a next transmission address. When the next transmission address conforms to the transmission commencement address which was stored before, the transmission of all data is completed.

(8) The procedures from (3) to (7) are repeated to transmit data successively.

(9) In the framer (26i) in the data channel IF (26h), the data which is queued to the transmission buffer is constructed as a packet at all times, and the data is transmitted to the SERDES (26j) as the transmission parallel data TPD each time the construction is completed. The SERDES receives the transmission parallel data TPD, and modulates an electric signal which can be conveyed by the data channel, and transmits updated data as the transmission serial data TSD.

Figure 27:
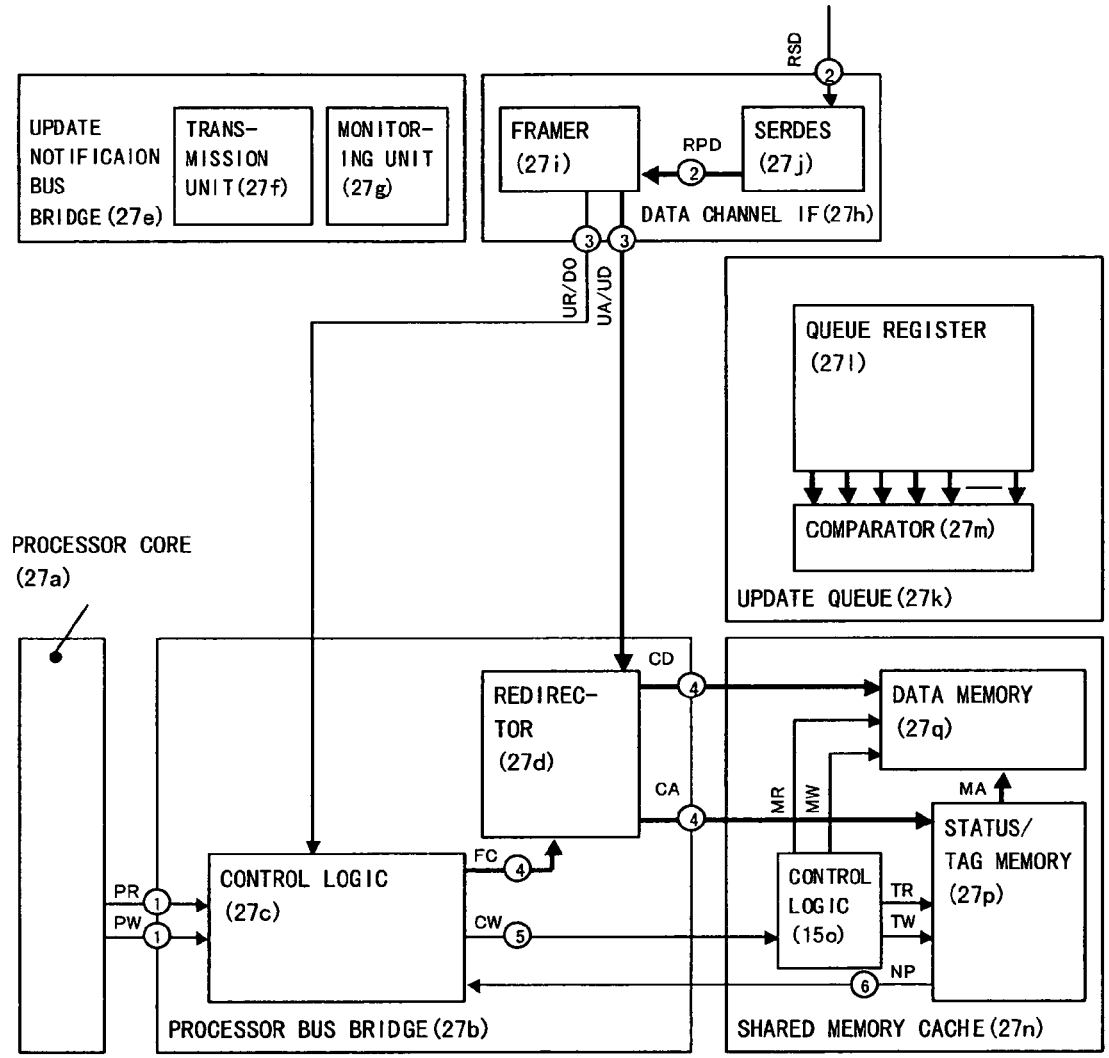
FIG. 27 shows the flow of signals when a processor which has been added to the system receives all data in the cache fill operation in a fourth embodiment of the present invention.

FIG. 27 shows the flow of signals when a processor which has been added to the system receives all data in the cache fill operation in a fourth embodiment of the present invention. The flow is described below. The number assigned to each of the following flows corresponds to the number assigned to each signal shown in FIG. 27.

(1) When the control logic (27c) in the processor bus bridge (27b) receives the processor read signal PR or the processor write signal PW during the all data receiving operation, the control logic (27C) keeps this request pending. Queuing to and clearance of the update queue are performed in accordance with the flow shown in FIG. 16 and FIG. 17 even during the all data receiving operation.

(2) The SERDES (27j) in the data channel IF (27h) demodulates the received serial data RSD, and transmits RSD to the framer (27i) as received parallel data RPD.

(3) The framer (27i) in the data channel IF (27h) receives RPD, extracts and decompresses a packet in the data, sets the updated data address UA, the updated data UD, and the data only attribute DO, and transmits the updated data receiving signal UR.

(4) The control logic (27c) in the processor bus bridge (27b) receives the updated data receiving signal UR and sets the redirector function control signal FC. The redirector (27d) echoes UA to the cache address CA and UD to the cache data CD accordingly. If any other processing is being performed in the control logic (27c), the redirector waits, and as soon as the processing is completed, the redirector performs said processing.

(5) The control logic (27c) in the processor bus bridge (27b) transmits a cache write signal CW. As the control logic (27c) has received the data only attribute DO, it does not transmits the queue clear signal QC.

(6) The shared memory cache (27n) which receives the cache write signal CW updates the desired data designated by CA and CD, and transmits the unusable signal NP when said data cannot be used before said data is updated.

(7) When the control logic (27c) in the processor bus bridge (27b) counts how many times the unusable signal NP has been received during the all data receiving operation, and recognizes that the entire area of the shared memory cache has been filled by effective data, the control logic (27c) completes the all data receiving operation.

(8) If there is a processor read signal PR or a processor write signal PW which is kept pending when the all data receiving operation is completed, the control logic (27c) begins that operation.

Figure 28:
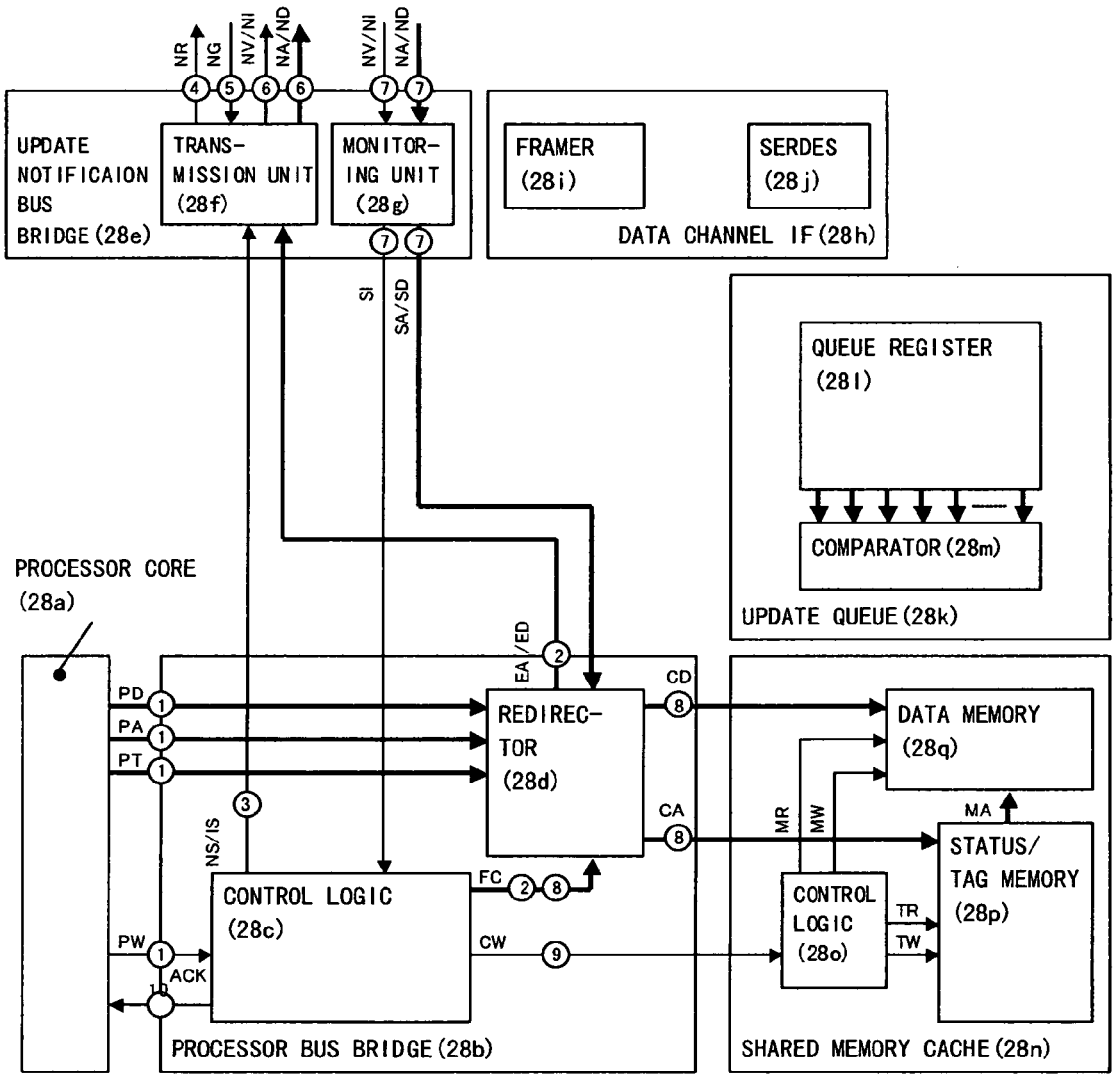
FIG. 28 shows the flow of signals when write access is performed based on a fifth embodiment of the present invention.

FIG. 28 shows the flow of signals when write access is performed based on a fifth embodiment of the present invention. The flow is described below. The number assigned to each of the following flows corresponds to the number assigned to each signal shown in FIG. 28.

(1) The processor (28a) sets PA, PD, and PT, and transmits PW.

(2) The control logic (28c) in the processor bus bridge (28b) sets the redirector function control signal FC. Accordingly, the redirector (28c) echoes the processor address PA to the effective address EF and the cache address CA, and echoes the processor data PD to the effective data ED and the cache data CD.

(3) The control logic (28c) in the processor bus bridge (28b) transmits the update notification transmission signal NS. At the same time, when there is PA in a prescribed address space, the control logic (28c) transmits the immediate update attribute transmission signal IS.

(4) The transmission unit (28f) in the update notification bus bridge (28e) receives NS, and transmits NR.

(5) The transmission unit (28f) in the update notification bus bridge (28e) receives NG, and acquires the update notification bus.

(6) EA is echoed to the update notification address NA, IS is echoed to the immediate update attribute signal NI, ED is echoed to the immediate updated data ND, and the update notification signal NV is transmitted to all the processors. NA, ND, NV, and NI are also looped back to the monitoring unit (28g) in the update notification bus bridge (28e) of the same processor and are received by the monitoring unit (28g).

(7) The monitoring unit (28g) in the update notification bus bridge (28e), when receiving NV with NI, echoes NV to the same processor as the immediate update signal SI. The same operation is also performed on the other processors.

(8) The control logic (28c) in the processor bus bridge (28b) sets the redirector function control signal FC. The redirector (28d) echoes SA to CA, and SD to CD accordingly. The same operation is also performed on the other processors. When the processor bus bridge (28b) is performing any other processing, the redirector (28d) performs said processing after the other processing is completed.

(9) The control logic (28c) in the processor bus bridge (28b) transmits the cache write signal CW, and the shared memory cache (28n), when receiving CW, updates the desired data designated by CA in CD. The same operation is also performed on the other processors.

(10) ACK is transmitted to the processor core, and access on the processor cores side is completed.

For write access based on the sixth embodiment of the present invention, reserved data is used when write to a specified address is performed, and the flow of signals is almost equivalent to that in the fifth embodiment. The following is the difference.

(8) When SA is interpreted to be a specified address which uses reserved data for the access, the redirector (28d) in the processor bus bridge (28b) neglects SD, produces reserved data corresponding to SA, and outputs the reserved data to CD.

In the shared memory type multi-processor systems comprising processors having shared memory caches, the time required for the guarantee of coherency and the time required for data transfer are clearly separated, and the problems which existed in the conventional technology in access to a shared memory space are solved due to the application of the present invention, as follows.

Minimization of bus occupation time and elimination of an increase in an unnecessary-latency factor Concealment of latency in a data transfer path and making the expansion of bandwidth easy Because of these problems being solved, it is possible to use the high-speed capability of the shared memory cache to its maximum, and to improve both the bandwidth of the shared memory cache and its latency, thus contributing to the improvement of the processing capability of the system.

What is claimed is:

1. A multi-processor system in which a plurality of processors, each of which has its own shared memory cache, and at least one shared memory are connected to each other, comprising:
   a dedicated line unit for exclusively transmitting and receiving data to be used for update between a processor and a shared memory in updating data in a shared memory area; and
   a global bus unit for transmitting a data update notification while arbitrating the right to transmit the data update notification to each processor, wherein
   the transmission of the update notification of said data from the processor and the transmission of the data to be used for update are performed independently;
   each processor and the shared memory, when receiving the update notification, limit access to the address indicated by the update notification;
   after data of said address of the shared memory area is updated by the data to be used for update which has reached each processor and the shared memory, access to said address is permitted.

2. The multi-processor system according to claim 1, wherein
   the dedicated line unit has a repeater unit for connecting a line from the processor to the shared memory.

3. The multi-processor system according to claim 2, wherein
   the dedicated line unit comprises a dedicated line provided in each of the plurality of processors.

4. The multi-processor system according to claim 1, wherein
   a plurality of updated data are associated with the update notification, and data update in units of a plurality of updated data is performed in a single update.

5. The multi-processor system according to claim 4, wherein
   in the update notification, the size of data which is used for update in a single update is made variable.

6. The multi-processor system according to claim 1, wherein
   the update of data in the shared memory space which does not need to maintain cache coherency is performed by transmitting updated data to the address of the data which does not need to maintain the cache coherency without transmitting the update notification.

7. The multi-processor system according to claim 1, wherein
   when a new processor is added to the multi-processor system, the contents of the shared memory cache of the other processors are transferred to the shared memory cache of said processor, and after that the said processor is made operational.

8. The multi-processor system according to claim 1, further comprising:
   a unit for transferring an update notification and data to be used for update using the global bus unit, and updating the shared memory area.

9. The multi-processor system according to claim 1, wherein
   for access to a specified address in the shared memory area, the processor or shared memory which transmits and receives only the update notification and receives the update notification updates the address using the data which has been prescribed in advance.

10. A method for speeding up memory access in a multi-processor system in which a plurality of processors, each of which has its own shared memory cache, and at least one shared memory are connected to each other, comprising:
   providing a dedicated line unit exclusively for transmitting and receiving data to be used for update between a processor and a shared memory in updating data in a shared memory area; and
   providing a global bus unit for transmitting a data update notification while arbitrating the right to transmit the data update notification to each processor; and
   a step in which the transmission of the update notification of said data from the processor and the transmission of the data to be used for update are performed independently;
   each processor and the shared memory, when receiving the update notification, limit access to the address indicated by the update notification;
   after data of said address of the shared memory area is updated by each processor and the data to be used for update which reaches the shared memory, access to said address is permitted.

* * * * *